United States Patent
Crocco et al.

(10) Patent No.: US 10,138,341 B2
(45) Date of Patent: Nov. 27, 2018

(54) USE OF EVAPORATIVE COOLANTS TO MANUFACTURE FILLED POLYURETHANE COMPOSITES

(71) Applicant: BORAL IP HOLDINGS (AUSTRALIA) PTY LIMITED, North Sydney (AU)

(72) Inventors: Guy Crocco, New Braunfels, TX (US); Russ K. Majors, San Marcos, TX (US); Russell L. Hill, San Antonio, TX (US); Brian Shaw, Elmendorf, TX (US)

(73) Assignee: Boral IP Holdings (Australia) PTY Limited, North Sydney (AU)

( * ) Notice: Subject to any disclaimer, the term of this patent is extended or adjusted under 35 U.S.C. 154(b) by 0 days.

(21) Appl. No.: 14/649,077

(22) PCT Filed: Jul. 28, 2014

(86) PCT No.: PCT/US2014/048465
§ 371 (c)(1),
(2) Date: Jun. 2, 2015

(87) PCT Pub. No.: WO2016/018226
PCT Pub. Date: Feb. 4, 2016

(65) Prior Publication Data
US 2016/0280874 A1    Sep. 29, 2016

(51) Int. Cl.
| | | |
|---|---|---|
| *C08J 9/00* | (2006.01) |
| *C08G 18/48* | (2006.01) |
| *C08G 18/50* | (2006.01) |
| *C08G 18/54* | (2006.01) |
| *C08G 18/76* | (2006.01) |
| *C08G 18/40* | (2006.01) |
| *C08G 18/42* | (2006.01) |
| *C08J 9/14* | (2006.01) |
| *B29K 75/00* | (2006.01) |
| *B29K 105/04* | (2006.01) |
| *C08G 101/00* | (2006.01) |
| *B29C 44/34* | (2006.01) |

(52) U.S. Cl.
CPC ........ *C08J 9/0019* (2013.01); *C08G 18/4027* (2013.01); *C08G 18/4208* (2013.01); *C08G 18/482* (2013.01); *C08G 18/4829* (2013.01); *C08G 18/5021* (2013.01); *C08G 18/546* (2013.01); *C08G 18/7671* (2013.01); *C08J 9/146* (2013.01); *B29C 44/3415* (2013.01); *B29K 2075/00* (2013.01); *B29K 2105/04* (2013.01); *C08G 2101/0083* (2013.01); *C08J 2201/03* (2013.01); *C08J 2203/142* (2013.01); *C08J 2375/08* (2013.01)

(58) Field of Classification Search
CPC ................ B29C 44/30; B29K 2075/00; B29K 2105/04; C08G 18/4208; C08G 18/482; C08G 18/4829; C08G 18/5021; C08G 18/7671; C08G 2101/0083; C08J 9/0019; C08J 2375/08
See application file for complete search history.

(56) References Cited

U.S. PATENT DOCUMENTS

| | | |
|---|---|---|
| 529,535 A | 11/1894 | Smith |
| 529,538 A | 11/1894 | Vaughn |
| 2,526,033 A | 10/1950 | Lyon |
| 2,817,875 A | 12/1957 | Harris et al. |
| 2,833,730 A | 5/1958 | Barthel, Jr. |
| RE24,514 E | 8/1958 | Hoppe et al. |
| 2,902,388 A | 9/1959 | Szukiewicz |
| 2,983,693 A | 5/1961 | Sievers |
| 3,065,500 A | 11/1962 | Berner |
| 3,071,297 A | 1/1963 | Lee |
| 3,078,240 A | 2/1963 | Hoshino et al. |

(Continued)

FOREIGN PATENT DOCUMENTS

| | | |
|---|---|---|
| CA | 2037130 | 1/2006 |
| CN | 1251596 | 4/2000 |

(Continued)

OTHER PUBLICATIONS

Soya-based isocyanate alternatives coming? (US Newslines), Apr. 1, 2007.

(Continued)

*Primary Examiner* — John M Cooney
(74) *Attorney, Agent, or Firm* — Bookoff McAndrews, PLLC

(57) ABSTRACT

Polyurethane composites and methods of preparation are described herein. The methods of making the polyurethane composite can include mixing (1) at least one isocyanate selected from the group consisting of diisocyanates, polyisocyanates, and mixtures thereof, (2) at least one polyol, (3) an inorganic filler, and (4) an evaporative coolant in an extruder to form a mixture. The method also include extruding the mixture into a mold cavity, generating heat in the mold cavity from the reaction of the at least one isocyanate and the at least one polyol, and allowing the evaporative coolant to migrate to an interface between the mixture and the interior mold surface. The temperature of the mixture causes evaporation of the evaporative coolant at the interface thereby removing heat at the interface. Suitable evaporative coolants for use in the methods of making the polyurethane composites include hydrofluorocarbons and hydrochlorofluorocarbons.

28 Claims, No Drawings

(56) References Cited

U.S. PATENT DOCUMENTS

| | | |
|---|---|---|
| 3,078,512 A | 2/1963 | De Haven |
| 3,178,490 A | 4/1965 | Petrino et al. |
| 3,182,104 A | 5/1965 | Cwik |
| 3,223,027 A | 12/1965 | Soda et al. |
| 3,262,151 A | 7/1966 | Oxel |
| 3,269,961 A | 8/1966 | Bruson et al. |
| 3,308,218 A | 3/1967 | Wiegand et al. |
| 3,466,705 A | 9/1969 | Richie |
| 3,528,126 A | 9/1970 | Ernst et al. |
| 3,566,448 A | 3/1971 | Ernst |
| 3,608,008 A | 9/1971 | Soukup et al. |
| 3,644,168 A | 2/1972 | Bonk et al. |
| 3,698,731 A | 10/1972 | Jost et al. |
| 3,726,624 A | 4/1973 | Schwarz |
| 3,728,288 A | 4/1973 | Cobbs, Jr. et al. |
| 3,736,081 A | 5/1973 | Yovanvich |
| 3,738,895 A | 6/1973 | Paymal |
| 3,764,247 A | 10/1973 | Garrett et al. |
| 3,768,937 A | 10/1973 | Haga et al. |
| 3,774,428 A | 11/1973 | Derry et al. |
| 3,802,582 A | 4/1974 | Brock |
| 3,816,043 A | 6/1974 | Snelling et al. |
| 3,819,574 A | 6/1974 | Brown et al. |
| 3,824,057 A | 7/1974 | Kornylak et al. |
| 3,830,776 A | 8/1974 | Carlson et al. |
| 3,832,429 A | 8/1974 | Charpentier |
| 3,841,390 A | 10/1974 | DiBenedetto et al. |
| 3,843,757 A | 10/1974 | Ehrenfreund et al. |
| 3,852,387 A | 12/1974 | Bortnick et al. |
| 3,867,494 A | 2/1975 | Rood et al. |
| 3,878,027 A | 4/1975 | Troutner |
| 3,890,077 A | 6/1975 | Holman |
| 3,910,179 A | 10/1975 | Troutner |
| 3,917,547 A | 11/1975 | Massey |
| 3,917,571 A | 11/1975 | Olstowski et al. |
| 3,917,774 A | 11/1975 | Sagane et al. |
| 3,928,258 A | 12/1975 | Alexander |
| 3,963,679 A | 6/1976 | Ullrich et al. |
| 3,981,654 A | 9/1976 | Rood et al. |
| 3,991,005 A | 11/1976 | Wallace |
| 3,999,230 A | 12/1976 | Bruning et al. |
| 4,005,035 A | 1/1977 | Deaver |
| 4,025,257 A | 5/1977 | Sagane et al. |
| 4,042,314 A | 8/1977 | Bruning et al. |
| 4,051,742 A | 10/1977 | Johansson et al. |
| 4,060,579 A | 11/1977 | Schmitzer et al. |
| 4,065,410 A | 12/1977 | Schafer et al. |
| 4,073,840 A | 2/1978 | Saidla |
| 4,078,032 A | 3/1978 | Wenner |
| 4,092,276 A | 5/1978 | Narayan |
| 4,104,094 A | 8/1978 | Peterson |
| 4,107,248 A | 8/1978 | Schlieckmann |
| 4,120,626 A | 10/1978 | Keller |
| 4,127,040 A | 11/1978 | Moore et al. |
| 4,128,369 A | 12/1978 | Kemerer |
| 4,137,200 A | 1/1979 | Wood et al. |
| 4,141,862 A | 2/1979 | Raden et al. |
| 4,143,759 A | 3/1979 | Paradis |
| 4,149,840 A | 4/1979 | Tippman |
| 4,153,768 A | 5/1979 | Blount |
| 4,160,749 A | 7/1979 | Schneider et al. |
| 4,160,853 A | 7/1979 | Ammons |
| 4,163,824 A | 8/1979 | Saidla |
| 4,164,439 A | 8/1979 | Coonrod |
| 4,164,526 A | 8/1979 | Clay et al. |
| 4,165,414 A | 8/1979 | Narayan et al. |
| 4,180,538 A | 12/1979 | Morikawa et al. |
| 4,209,605 A | 6/1980 | Hoy et al. |
| 4,210,572 A | 7/1980 | Herman et al. |
| 4,214,864 A | 7/1980 | Tabler |
| 4,221,877 A | 9/1980 | Cuscurida et al. |
| 4,240,950 A | 12/1980 | von Bonin et al. |
| 4,243,755 A | 1/1981 | Marx et al. |
| 4,246,363 A | 1/1981 | Turner |
| 4,247,656 A | 1/1981 | Janssen |
| 4,248,975 A | 2/1981 | Satterly |
| 4,251,428 A | 2/1981 | Recker et al. |
| 4,254,002 A | 3/1981 | Sperling et al. |
| 4,254,176 A | 3/1981 | Muller et al. |
| 4,256,846 A | 3/1981 | Ohasi et al. |
| 4,260,538 A | 4/1981 | Iseler et al. |
| 4,261,946 A | 4/1981 | Goyert et al. |
| 4,272,377 A | 6/1981 | Gerlach et al. |
| 4,275,033 A | 6/1981 | Schulte et al. |
| 4,276,337 A | 6/1981 | Coonrod |
| 4,282,329 A | 8/1981 | von Bonin et al. |
| 4,282,988 A | 8/1981 | Hulber, Jr. |
| 4,284,826 A | 8/1981 | Aelony |
| 4,290,248 A | 9/1981 | Kemerer et al. |
| 4,300,776 A | 11/1981 | Taubenmann |
| 4,330,494 A | 5/1982 | Iwata et al. |
| 4,331,726 A | 5/1982 | Cleary |
| 4,338,422 A | 7/1982 | Jackson, Jr. et al. |
| 4,339,366 A | 7/1982 | Blount |
| 4,340,681 A | 7/1982 | Reuter et al. |
| 4,342,847 A | 8/1982 | Goyert et al. |
| 4,344,873 A | 8/1982 | Wick |
| 4,347,281 A | 8/1982 | Futcher et al. |
| 4,359,359 A | 11/1982 | Gerlach et al. |
| 4,359,548 A | 11/1982 | Blount |
| 4,366,204 A | 12/1982 | Briggs |
| 4,367,259 A | 1/1983 | Fulmer et al. |
| 4,376,171 A | 3/1983 | Blount |
| 4,381,352 A | 4/1983 | McBrayer |
| 4,382,056 A | 5/1983 | Coonrod |
| 4,383,818 A | 5/1983 | Swannell |
| 4,390,581 A | 6/1983 | Cogswell et al. |
| 4,395,214 A | 7/1983 | Phipps et al. |
| 4,396,791 A | 8/1983 | Mazzoni |
| 4,397,983 A | 8/1983 | Hill et al. |
| 4,412,033 A | 10/1983 | LaBelle et al. |
| 4,414,174 A | 11/1983 | Klempner et al. |
| 4,439,548 A | 3/1984 | Weisman |
| 4,450,133 A | 5/1984 | Cafarelli |
| 4,454,251 A | 6/1984 | Frisch et al. |
| 4,460,737 A | 7/1984 | Evans et al. |
| 4,465,500 A | 8/1984 | Motsinger et al. |
| 4,483,727 A | 11/1984 | Eickman et al. |
| 4,489,023 A | 12/1984 | Proksa |
| 4,512,942 A | 4/1985 | Babbin et al. |
| 4,514,162 A | 4/1985 | Schulz |
| 4,532,098 A | 7/1985 | Campbell et al. |
| 4,540,357 A | 9/1985 | Campbell et al. |
| 4,568,702 A | 2/1986 | Mascioli |
| 4,576,718 A | 3/1986 | Reischl et al. |
| 4,576,974 A | 3/1986 | Carroll et al. |
| 4,581,186 A | 4/1986 | Larson |
| 4,595,709 A | 6/1986 | Reischl |
| 4,597,927 A | 7/1986 | Zeitler et al. |
| 4,600,311 A | 7/1986 | Mourrier et al. |
| 4,604,410 A | 8/1986 | Altenberg |
| 4,649,162 A | 3/1987 | Roche et al. |
| 4,661,533 A | 4/1987 | Stobby |
| 4,677,157 A | 6/1987 | Jacobs |
| 4,680,214 A | 7/1987 | Frisch et al. |
| 4,714,778 A | 12/1987 | Burgoyne, Jr. et al. |
| 4,717,027 A | 1/1988 | Laure et al. |
| 4,724,250 A | 2/1988 | Schubert et al. |
| 4,728,287 A | 3/1988 | Niems |
| 4,728,288 A | 3/1988 | Niems |
| 4,734,455 A | 3/1988 | Mobley et al. |
| 4,737,524 A | 4/1988 | Ako et al. |
| 4,780,484 A | 10/1988 | Schubert et al. |
| 4,780,498 A | 10/1988 | Goerrissen et al. |
| 4,795,763 A | 1/1989 | Gluck et al. |
| 4,802,769 A | 2/1989 | Tanaka |
| 4,826,429 A | 5/1989 | Niems |
| 4,826,944 A | 5/1989 | Hoefer et al. |
| 4,832,183 A | 5/1989 | Lapeyre |
| 4,835,195 A | 5/1989 | Rayfield et al. |
| 4,855,184 A | 8/1989 | Klun et al. |
| 4,892,891 A | 1/1990 | Close |
| 4,895,352 A | 1/1990 | Stumpf |
| 4,948,859 A | 8/1990 | Echols et al. |

(56) References Cited

U.S. PATENT DOCUMENTS

| | | |
|---|---|---|
| 4,995,801 A | 2/1991 | Hehl |
| 5,001,165 A | 3/1991 | Canaday et al. |
| 5,010,112 A | 4/1991 | Glicksman et al. |
| 5,028,648 A | 7/1991 | Famili et al. |
| 5,033,860 A | 7/1991 | Nakamura |
| 5,051,222 A | 9/1991 | Marten et al. |
| 5,053,274 A | 10/1991 | Jonas |
| 5,064,293 A | 11/1991 | Nakamura |
| 5,091,436 A | 2/1992 | Frisch et al. |
| 5,094,798 A | 3/1992 | Hewitt |
| 5,096,993 A | 3/1992 | Smith et al. |
| 5,102,918 A | 4/1992 | Moriya |
| 5,102,969 A | 4/1992 | Scheffler et al. |
| 5,114,630 A | 5/1992 | Newman et al. |
| 5,128,379 A | 7/1992 | Stone |
| 5,149,722 A | 9/1992 | Soukup |
| 5,149,739 A | 9/1992 | Lee |
| 5,159,012 A | 10/1992 | Doesburg et al. |
| 5,166,301 A | 11/1992 | Jacobs |
| 5,167,899 A | 12/1992 | Jezic |
| 5,185,420 A | 2/1993 | Smith et al. |
| 5,186,539 A | 2/1993 | Manser et al. |
| 5,229,138 A | 7/1993 | Carotti |
| 5,240,969 A | 8/1993 | Brown |
| 5,252,697 A | 10/1993 | Jacobs et al. |
| 5,271,699 A | 12/1993 | Barre et al. |
| 5,278,195 A | 1/1994 | Volkert et al. |
| 5,296,545 A | 3/1994 | Heise |
| 5,300,531 A | 4/1994 | Weaver |
| 5,302,634 A | 4/1994 | Mushovic |
| 5,330,341 A | 7/1994 | Kemerer et al. |
| 5,331,044 A | 7/1994 | Lausberg et al. |
| 5,340,300 A | 8/1994 | Saeki et al. |
| 5,344,490 A | 9/1994 | Roosen et al. |
| 5,361,945 A | 11/1994 | Johanson |
| 5,369,147 A | 11/1994 | Mushovic |
| 5,375,988 A | 12/1994 | Klahre |
| 5,424,013 A | 6/1995 | Lieberman |
| 5,424,014 A | 6/1995 | Glorioso et al. |
| 5,432,204 A | 7/1995 | Farkas |
| 5,439,711 A | 8/1995 | Vu et al. |
| 5,453,231 A | 9/1995 | Douglas |
| 5,455,312 A | 10/1995 | Heidingsfeld et al. |
| 5,458,477 A | 10/1995 | Kemerer et al. |
| 5,458,831 A | 10/1995 | Saeki et al. |
| 5,491,174 A | 2/1996 | Grier et al. |
| 5,495,640 A | 3/1996 | Mullet et al. |
| 5,505,599 A | 4/1996 | Kemerer et al. |
| 5,508,315 A | 4/1996 | Mushovic |
| 5,514,430 A | 5/1996 | Andersen et al. |
| 5,522,446 A | 6/1996 | Mullet et al. |
| 5,527,172 A | 6/1996 | Graham, Jr. |
| 5,527,833 A | 6/1996 | Kuczynski et al. |
| 5,532,065 A | 7/1996 | Gubitz et al. |
| 5,536,781 A | 7/1996 | Heidingsfeld et al. |
| 5,554,713 A | 9/1996 | Freeland |
| 5,562,141 A | 10/1996 | Mullet et al. |
| 5,565,497 A | 10/1996 | Godbey et al. |
| 5,566,740 A | 10/1996 | Mullet et al. |
| 5,567,791 A | 10/1996 | Brauer et al. |
| 5,569,713 A | 10/1996 | Lieberman |
| 5,582,840 A | 12/1996 | Pauw et al. |
| 5,582,849 A | 12/1996 | Lupke |
| 5,604,266 A | 2/1997 | Mushovic |
| 5,611,976 A | 3/1997 | Klier et al. |
| 5,621,024 A | 4/1997 | Eberhardt et al. |
| 5,631,103 A | 5/1997 | Eschbach et al. |
| 5,631,319 A | 5/1997 | Reese et al. |
| 5,634,953 A | 6/1997 | Wissmann |
| 5,643,516 A | 7/1997 | Raza et al. |
| 5,681,915 A | 10/1997 | Lechner et al. |
| 5,688,890 A | 11/1997 | Ishiguro et al. |
| 5,696,205 A | 12/1997 | Muller et al. |
| 5,700,495 A | 12/1997 | Kemerer et al. |
| 5,707,474 A | 1/1998 | Andersen et al. |
| 5,710,231 A | 1/1998 | Fogg et al. |
| 5,723,506 A | 3/1998 | Glorioso et al. |
| 5,728,337 A | 3/1998 | Yoshikawa et al. |
| 5,759,695 A | 6/1998 | Primeaux, II |
| 5,760,133 A | 6/1998 | Heidingsfeld et al. |
| 5,769,281 A | 6/1998 | Bates |
| 5,782,283 A | 7/1998 | Kendall |
| 5,783,125 A | 7/1998 | Bastone et al. |
| 5,783,629 A | 7/1998 | Srinivasan et al. |
| 5,795,949 A | 8/1998 | Daute et al. |
| 5,798,533 A | 8/1998 | Fishback et al. |
| 5,811,506 A | 9/1998 | Slagel |
| 5,817,402 A | 10/1998 | Miyake et al. |
| 5,836,499 A | 11/1998 | Mullet et al. |
| 5,837,742 A | 11/1998 | Fishback |
| 5,844,015 A | 12/1998 | Steilen et al. |
| 5,872,168 A | 2/1999 | Katoot |
| 5,908,701 A | 6/1999 | Jennings et al. |
| 5,929,153 A | 7/1999 | Mori et al. |
| 5,932,337 A | 8/1999 | Edinger et al. |
| 5,934,352 A | 8/1999 | Morgan |
| 5,945,460 A | 8/1999 | Ekart et al. |
| 5,952,053 A | 9/1999 | Colby |
| 5,962,144 A | 10/1999 | Primeaux, II |
| 5,981,655 A | 11/1999 | Heidingsfeld et al. |
| 5,993,551 A | 11/1999 | Hahn |
| 6,000,102 A | 12/1999 | Lychou |
| 6,019,269 A | 2/2000 | Mullet et al. |
| 6,020,387 A | 2/2000 | Downey et al. |
| 6,040,381 A | 3/2000 | Jennings et al. |
| 6,051,634 A | 4/2000 | Laas et al. |
| 6,055,781 A | 5/2000 | Johanson |
| 6,060,531 A | 5/2000 | Horn et al. |
| 6,062,719 A | 5/2000 | Busby et al. |
| 6,086,802 A | 7/2000 | Levera et al. |
| 6,096,401 A | 8/2000 | Jenkines |
| 6,103,340 A | 8/2000 | Kubo et al. |
| 6,107,355 A | 8/2000 | Horn et al. |
| 6,107,433 A | 8/2000 | Petrovic et al. |
| 6,120,905 A | 9/2000 | Figovsky |
| 6,133,329 A | 10/2000 | Shieh et al. |
| 6,136,246 A | 10/2000 | Rauwendaal et al. |
| 6,136,870 A | 10/2000 | Triolo et al. |
| 6,140,381 A | 10/2000 | Rosthauser et al. |
| 6,146,556 A | 11/2000 | Katoot |
| 6,177,232 B1 | 1/2001 | Melisaris et al. |
| 6,180,192 B1 | 1/2001 | Smith et al. |
| 6,180,686 B1 | 1/2001 | Kurth |
| RE37,095 E | 3/2001 | Glorioso et al. |
| 6,204,312 B1 | 3/2001 | Taylor |
| 6,211,259 B1 | 4/2001 | Borden et al. |
| 6,220,745 B1 | 4/2001 | Kobayashi et al. |
| 6,224,797 B1 | 5/2001 | Franzen et al. |
| 6,228,933 B1 | 5/2001 | Hiles |
| 6,234,777 B1 | 5/2001 | Sperry et al. |
| 6,235,367 B1 | 5/2001 | Holmes et al. |
| 6,252,031 B1 | 6/2001 | Tsutsumi et al. |
| 6,257,643 B1 | 7/2001 | Young |
| 6,257,644 B1 | 7/2001 | Young |
| 6,258,310 B1 | 7/2001 | Sardanopoli et al. |
| 6,258,917 B1 | 7/2001 | Slagel |
| 6,264,462 B1 | 7/2001 | Gallagher |
| 6,265,457 B1 | 7/2001 | Dolgopolsky et al. |
| 6,271,276 B1 | 8/2001 | Gribble et al. |
| 6,284,841 B1 | 9/2001 | Friesner |
| 6,294,637 B1 | 9/2001 | Brauer et al. |
| 6,297,321 B1 | 10/2001 | Onder et al. |
| 6,309,507 B1 | 10/2001 | Morikawa et al. |
| 6,312,244 B1 | 11/2001 | Levera et al. |
| 6,313,186 B1 | 11/2001 | Kaida et al. |
| 6,321,904 B1 | 11/2001 | Mitchell |
| 6,329,448 B1 | 12/2001 | Gutsche et al. |
| 6,331,577 B1 | 12/2001 | Volkert et al. |
| 6,343,924 B1 | 2/2002 | Klepsch |
| 6,348,514 B1 | 2/2002 | Calabrese et al. |
| 6,383,599 B1 | 5/2002 | Bell et al. |
| 6,387,504 B1 | 5/2002 | Mushovic |
| 6,399,698 B1 | 6/2002 | Petrovic et al. |
| 6,409,949 B1 | 6/2002 | Tanaka et al. |

(56) References Cited

U.S. PATENT DOCUMENTS

| | | |
|---|---|---|
| 6,420,034 B1 | 7/2002 | Takahashi et al. |
| 6,423,755 B1 | 7/2002 | Allen et al. |
| 6,429,257 B1 | 8/2002 | Buxton et al. |
| 6,432,335 B1 | 8/2002 | Ladang et al. |
| 6,433,032 B1 | 8/2002 | Hamilton |
| 6,433,121 B1 | 8/2002 | Petrovic et al. |
| 6,441,534 B2 | 8/2002 | Iino et al. |
| 6,455,605 B1 | 9/2002 | Giorgini et al. |
| 6,455,606 B1 | 9/2002 | Kaku et al. |
| 6,458,866 B1 | 10/2002 | Oppermann et al. |
| 6,465,569 B1 | 10/2002 | Kurth |
| 6,467,610 B1 | 10/2002 | MacLachlan |
| 6,469,667 B2 | 10/2002 | Fox et al. |
| 6,485,665 B1 | 11/2002 | Hermanutz et al. |
| 6,486,224 B2 | 11/2002 | Lin et al. |
| 6,508,362 B2 | 1/2003 | Hnatow et al. |
| 6,524,978 B1 | 2/2003 | Moore |
| 6,534,617 B1 | 3/2003 | Batt et al. |
| 6,541,534 B2 | 4/2003 | Allen et al. |
| 6,552,660 B1 | 4/2003 | Lisowski |
| 6,555,199 B1 | 4/2003 | Jenkines |
| 6,571,935 B1 | 6/2003 | Campbell et al. |
| 6,573,309 B1 | 6/2003 | Reitenbach et al. |
| 6,573,354 B1 | 6/2003 | Petrovic et al. |
| 6,578,619 B2 | 6/2003 | Wright |
| 6,579,932 B1 | 6/2003 | Schipper et al. |
| 6,604,848 B2 | 8/2003 | Tanaka et al. |
| 6,605,343 B1 | 8/2003 | Motoi et al. |
| 6,609,638 B1 | 8/2003 | Lott |
| 6,610,756 B1 | 8/2003 | Shimizu et al. |
| 6,613,827 B2 | 9/2003 | Lundgard et al. |
| 6,616,886 B2 | 9/2003 | Peterson et al. |
| 6,617,009 B1 | 9/2003 | Chen et al. |
| 6,624,244 B2 | 9/2003 | Kurth |
| 6,641,384 B2 | 11/2003 | Bosler et al. |
| 6,646,093 B2 | 11/2003 | Tsuruta et al. |
| 6,649,084 B2 | 11/2003 | Morikawa et al. |
| 6,649,667 B2 | 11/2003 | Clatty |
| 6,686,435 B1 | 2/2004 | Petrovic et al. |
| 6,695,902 B2 | 2/2004 | Hemmings et al. |
| 6,706,774 B2 | 3/2004 | Muzenberger et al. |
| 6,709,717 B2 | 3/2004 | Mushovic |
| 6,767,399 B2 | 7/2004 | Peev et al. |
| 6,769,220 B2 | 8/2004 | Friesner |
| 6,777,457 B2 | 8/2004 | Dolgopolsky et al. |
| 6,832,430 B1 | 12/2004 | Ogawa et al. |
| 6,849,676 B1 | 2/2005 | Shibano et al. |
| 6,864,296 B2 | 3/2005 | Kurth |
| 6,864,312 B2 | 3/2005 | Moore |
| 6,867,239 B2 | 3/2005 | Kurth |
| 6,871,457 B2 | 3/2005 | Quntero-Flores et al. |
| 6,881,763 B2 | 4/2005 | Kurth |
| 6,881,764 B2 | 4/2005 | Doesburg et al. |
| 6,903,156 B2 | 6/2005 | Muller et al. |
| 6,908,573 B2 | 6/2005 | Hossan |
| 6,916,863 B2 | 7/2005 | Hemmings et al. |
| 6,958,365 B2 | 10/2005 | Dontula et al. |
| 6,962,636 B2 | 11/2005 | Kurth et al. |
| 6,971,495 B2 | 12/2005 | Hedrick et al. |
| 6,972,144 B2 | 12/2005 | Roth et al. |
| 6,979,477 B2 | 12/2005 | Kurth et al. |
| 6,979,704 B1 | 12/2005 | Mayer et al. |
| 6,989,123 B2 | 1/2006 | Lee et al. |
| 6,997,346 B2 | 2/2006 | Landers et al. |
| 7,037,865 B1 | 5/2006 | Kimberly |
| 7,063,877 B2 | 6/2006 | Kurth et al. |
| 7,098,291 B2 | 8/2006 | Brinkman |
| 7,132,459 B1 | 11/2006 | Buchel |
| 7,160,976 B2 | 1/2007 | Luhmann et al. |
| 7,188,992 B2 | 3/2007 | Mattingly, Jr. |
| 7,196,124 B2 | 3/2007 | Parker et al. |
| 7,199,168 B2 | 4/2007 | Spitler et al. |
| 7,211,206 B2 | 5/2007 | Brown et al. |
| 7,241,818 B2 | 7/2007 | Hemmings et al. |
| 7,267,288 B2 | 9/2007 | Wheeler, Jr. et al. |
| 7,316,559 B2 | 1/2008 | Taylor |
| 7,491,351 B2 | 2/2009 | Taylor et al. |
| 7,651,645 B2 | 1/2010 | Taylor |
| 7,763,341 B2 | 7/2010 | Brown |
| 7,794,224 B2 | 9/2010 | Butteriss |
| 7,794,817 B2 | 9/2010 | Brown |
| 7,879,144 B2 | 2/2011 | Hemmings et al. |
| 8,846,776 B2 | 9/2014 | Herrington et al. |
| 9,000,061 B2 | 4/2015 | Ling et al. |
| 2001/0009683 A1 | 7/2001 | Kitahama et al. |
| 2002/0034598 A1 | 3/2002 | Bonk et al. |
| 2002/0040071 A1 | 4/2002 | Lin et al. |
| 2002/0045048 A1 | 4/2002 | Bonk et al. |
| 2002/0048643 A1 | 4/2002 | Bonk et al. |
| 2002/0086913 A1 | 7/2002 | Roels et al. |
| 2002/0098362 A1 | 7/2002 | Mushovic |
| 2002/0171164 A1 | 11/2002 | Halterbaum et al. |
| 2002/0192456 A1 | 12/2002 | Mashburn et al. |
| 2003/0004232 A1 | 1/2003 | Ruede |
| 2003/0021915 A1 | 1/2003 | Rohatgi et al. |
| 2003/0065045 A1 | 4/2003 | Falke et al. |
| 2003/0080203 A1 | 5/2003 | Roth et al. |
| 2003/0083394 A1 | 5/2003 | Clatty |
| 2003/0090016 A1 | 5/2003 | Petrovic et al. |
| 2003/0134920 A1 | 7/2003 | Poisl et al. |
| 2003/0143910 A1 | 7/2003 | Mashburn et al. |
| 2003/0158365 A1 | 8/2003 | Brauer et al. |
| 2003/0232933 A1 | 12/2003 | Lagneaux et al. |
| 2003/0232956 A1 | 12/2003 | Brinkman |
| 2004/0048055 A1 | 3/2004 | Branca |
| 2004/0049002 A1 | 3/2004 | Andrews et al. |
| 2004/0115415 A1 | 6/2004 | Thiele et al. |
| 2004/0121161 A1 | 6/2004 | Shugert et al. |
| 2004/0122119 A1 | 6/2004 | Burgess et al. |
| 2004/0132903 A1 | 7/2004 | Doesburg |
| 2004/0144287 A1 | 7/2004 | Tardif et al. |
| 2004/0147627 A1 | 7/2004 | Hager et al. |
| 2004/0176486 A1 | 9/2004 | Glorioso et al. |
| 2004/0198900 A1 | 10/2004 | Madaj |
| 2004/0266993 A1 | 12/2004 | Evans |
| 2005/0011159 A1 | 1/2005 | Standal et al. |
| 2005/0031578 A1 | 2/2005 | Deslauriers et al. |
| 2005/0070620 A1 | 3/2005 | Herrington et al. |
| 2005/0079339 A1 | 4/2005 | Riddle |
| 2005/0131092 A1 | 6/2005 | Kurth et al. |
| 2005/0131093 A1 | 6/2005 | Kurth et al. |
| 2005/0136259 A1 | 6/2005 | Mohanty et al. |
| 2005/0161855 A1 | 7/2005 | Brown et al. |
| 2005/0163969 A1 | 7/2005 | Brown |
| 2005/0171243 A1 | 8/2005 | Hemmings et al. |
| 2005/0182228 A1 | 8/2005 | Kurth |
| 2005/0208167 A1 | 9/2005 | You et al. |
| 2005/0222303 A1 | 10/2005 | Cernohous |
| 2005/0260351 A1 | 11/2005 | Kurth et al. |
| 2005/0281999 A1 | 12/2005 | Hoffman et al. |
| 2005/0287238 A1 | 12/2005 | Taylor |
| 2006/0003042 A1 | 1/2006 | Inoue et al. |
| 2006/0014891 A1 | 1/2006 | Yang et al. |
| 2006/0041155 A1 | 2/2006 | Casper |
| 2006/0041156 A1 | 2/2006 | Casper et al. |
| 2006/0045899 A1 | 3/2006 | Sarangapani |
| 2006/0071369 A1 | 4/2006 | Butteriss |
| 2006/0105145 A1 | 5/2006 | Brown |
| 2006/0115625 A1 | 6/2006 | Brown |
| 2006/0186571 A1 | 8/2006 | Brown |
| 2006/0186572 A1 | 8/2006 | Brown |
| 2006/0217517 A1 | 9/2006 | Daly |
| 2006/0251881 A1 | 11/2006 | Gilder |
| 2006/0269738 A1 | 11/2006 | Kimberly |
| 2006/0270747 A1 | 11/2006 | Griggs |
| 2006/0273486 A1 | 11/2006 | Griggs |
| 2006/0276609 A1 | 12/2006 | Lysenko et al. |
| 2006/0293428 A1 | 12/2006 | Singh et al. |
| 2007/0026142 A1 | 2/2007 | Singh et al. |
| 2007/0027227 A1 | 2/2007 | Shutov |
| 2007/0036975 A1 | 2/2007 | Miele et al. |
| 2007/0037953 A1 | 2/2007 | Geiger et al. |
| 2007/0052128 A1 | 3/2007 | Taylor |
| 2007/0056875 A1 | 3/2007 | Hlady et al. |

(56) References Cited

U.S. PATENT DOCUMENTS

| | | | |
|---|---|---|---|
| 2007/0066697 A1 | 3/2007 | Parker et al. | |
| 2007/0083003 A1 | 4/2007 | Gupta | |
| 2007/0155863 A1 | 7/2007 | Mohanty et al. | |
| 2007/0213456 A1 | 9/2007 | Singh et al. | |
| 2007/0222105 A1 | 9/2007 | Brown | |
| 2007/0222106 A1 | 9/2007 | Brown | |
| 2007/0225391 A1 | 9/2007 | Brown | |
| 2007/0225419 A1 | 9/2007 | Brown | |
| 2007/0275227 A1 | 11/2007 | Mashburn et al. | |
| 2008/0029925 A1 | 2/2008 | Brown | |
| 2008/0114086 A1 | 5/2008 | Lorenz et al. | |
| 2008/0132611 A1 | 6/2008 | Brown | |
| 2008/0237914 A1 | 10/2008 | Lustiger et al. | |
| 2009/0011671 A1 | 1/2009 | Doesburg et al. | |
| 2009/0099274 A1* | 4/2009 | Van Der Puy | C08G 18/1816 521/110 |
| 2009/0110869 A1 | 4/2009 | Streeton et al. | |
| 2009/0198036 A1 | 8/2009 | Duffy | |
| 2009/0295021 A1 | 12/2009 | Brown | |
| 2010/0025882 A1 | 2/2010 | Taylor et al. | |
| 2010/0201014 A1 | 8/2010 | Taylor | |
| 2010/0230852 A1 | 9/2010 | Brown | |
| 2010/0240785 A1 | 9/2010 | Hickey et al. | |
| 2010/0264559 A1 | 10/2010 | Brown | |
| 2010/0292397 A1 | 11/2010 | Brown | |
| 2010/0296361 A1 | 11/2010 | Brown | |
| 2011/0002190 A1 | 1/2011 | Tardif | |
| 2011/0086932 A1 | 4/2011 | Herrington et al. | |
| 2011/0086933 A1 | 4/2011 | Herrington et al. | |
| 2011/0086934 A1* | 4/2011 | Herrington et al. | |
| 2012/0029145 A1 | 2/2012 | Brown | |
| 2012/0101174 A1* | 4/2012 | Mittag | B29C 44/352 521/79 |
| 2012/0264842 A1* | 10/2012 | Tomovic et al. | |
| 2013/0059934 A1 | 5/2013 | Burgess et al. | |

FOREIGN PATENT DOCUMENTS

| | | |
|---|---|---|
| CN | 1052991 | 5/2000 |
| CN | 1926282 | 3/2007 |
| DE | 2351844 | 4/1975 |
| DE | 2713984 | 10/1978 |
| DE | 2714006 | 10/1978 |
| DE | 2740504 | 3/1979 |
| DE | 3839986 | 5/1990 |
| DE | 19528938 | 2/1997 |
| DE | 102006021266 | 11/2006 |
| DE | 102008063815 | 6/2010 |
| DE | 202008016807 | 6/2010 |
| EP | 0654297 | 5/1995 |
| EP | 0771827 | 5/1997 |
| EP | 0911453 | 4/1999 |
| EP | 1201703 | 5/2002 |
| EP | 1336461 | 5/2002 |
| EP | 1921098 | 5/2008 |
| EP | 1921099 | 5/2008 |
| EP | 1927535 | 6/2008 |
| GB | 790527 | 2/1958 |
| GB | 1152306 | 5/1969 |
| GB | 1246940 | 9/1971 |
| GB | 1314707 | 4/1973 |
| GB | 2300627 | 11/1996 |
| GB | 2306909 | 5/1997 |
| GB | 2347933 | 9/2000 |
| JP | 355080456 | 6/1980 |
| JP | 56007637 | 1/1981 |
| JP | 58132533 | 8/1983 |
| JP | 60002329 | 1/1985 |
| JP | 61081757 | 4/1986 |
| JP | 61209124 | 9/1986 |
| JP | 63-22819 | 1/1988 |
| JP | 63022819 | 1/1988 |
| JP | 63202408 | 8/1988 |
| JP | 4037506 | 2/1992 |
| JP | 5237913 | 9/1993 |
| JP | 5237914 | 9/1993 |
| JP | 5261796 | 10/1993 |
| JP | 05285941 | 11/1993 |
| JP | 6001252 | 1/1994 |
| JP | 6129742 | 5/1994 |
| JP | 6261669 | 9/1994 |
| JP | 07076395 | 3/1995 |
| JP | 07313941 | 12/1995 |
| JP | 08188634 | 7/1996 |
| JP | 11005245 | 1/1999 |
| JP | 11171960 | 6/1999 |
| JP | 2001326361 | 11/2001 |
| JP | 2004131654 | 4/2004 |
| JP | 2005138567 | 6/2005 |
| KR | 2002086327 | 11/2002 |
| NZ | 226301 | 3/1990 |
| WO | 81/03026 | 10/1981 |
| WO | 87/05541 | 9/1987 |
| WO | 91/00304 | 1/1991 |
| WO | 92/07892 | 5/1992 |
| WO | 93/19110 | 9/1993 |
| WO | 93/24549 | 12/1993 |
| WO | 94/25529 | 11/1994 |
| WO | 94/27697 | 12/1994 |
| WO | 95/18185 | 7/1995 |
| WO | 97/11114 | 3/1997 |
| WO | 97/44373 | 11/1997 |
| WO | 98/08893 | 3/1998 |
| WO | 99/37592 | 7/1999 |
| WO | 99/39891 | 8/1999 |
| WO | 00/04082 | 1/2000 |
| WO | 00/17249 | 3/2000 |
| WO | 00/64993 | 11/2000 |
| WO | 01/72863 | 10/2001 |
| WO | 01-85140 | 11/2001 |
| WO | 01/94470 | 12/2001 |
| WO | 02/01530 | 1/2002 |
| WO | 2002068490 A1 | 9/2002 |
| WO | 2004/065469 | 8/2004 |
| WO | 2004/078900 | 9/2004 |
| WO | 2004/113248 | 12/2004 |
| WO | 2005/006349 | 1/2005 |
| WO | 2005/053938 | 6/2005 |
| WO | 2005/056267 | 6/2005 |
| WO | 2005/072187 | 8/2005 |
| WO | 2005/072188 | 8/2005 |
| WO | 2005/094255 | 10/2005 |
| WO | 2005/123798 | 12/2005 |
| WO | 2006/012149 | 2/2006 |
| WO | 2006/114430 | 2/2006 |
| WO | 2006/118995 | 11/2006 |
| WO | 2006/137672 | 12/2006 |
| WO | 2007/014332 | 2/2007 |
| WO | 2007/087175 | 8/2007 |
| WO | 2007/112104 | 10/2007 |
| WO | 2007/112105 | 10/2007 |
| WO | 2008/110222 | 9/2008 |
| WO | 2008/127934 | 10/2008 |
| WO | 2008/154010 | 12/2008 |
| WO | 2009/045926 | 4/2009 |
| WO | 2009/048927 | 4/2009 |
| WO | 2010/078895 | 7/2010 |

OTHER PUBLICATIONS

Cayli et al., "Soybean Oil Based Isocyanates: Synthesis, Characterizations, and Polymerizations," Conference Abstract, 2nd Workshop on Fats and Oils as Renewable Feedstock for the Chemical Industry, Mar. 22-24, 2009.

Dolui, S.K., "Unusual effect of filler (CaCO3) on thermal degradation of polyurethane," Journal of Applied Polymer Science, 53(4): 463-465 (2003).

Hojabri et al., "Fatty Acid-Derived Diisocyanate and Biobased Polyurethane Produced from Vegetable Oil: Synthesis, Polymerization, and Characterization," Biomacromolecules, 10(4):884-891 (2009), abstract.

(56) References Cited

OTHER PUBLICATIONS

Horvath Jr., M., "Structural Polyurethane Foam Reaction Injection Molding," Journal of Cellular Plastics, Sep./Oct., pp. 289-293, 1976.
Inukai et al., "Glass Fiber Reinforced Rigid Polyurethane Foam (Elson Neo-Lumber FFU)," International Progress in Urethanes, vol. 5, Lancaster, PA, Technomic Publishing Co., Inc., 1988.
Morimoto et al., "Continuous Glass Fiber Reinforced Rigid Polyurethane Foam (Airlite FRU)," Internatinoal Progress in Urethanes, vol. 5, Lancaster, PA, Technomic Publishing Co., Inc., 1988.
Okagawa et al., "Glass Fibre Reinforced Rigid Polyurethane Foam," Cellular and non cellular polyurethanes, Carl Hanser Verlag Munchen Wien Druck und Bindung, Germany, p. 453-467, 1980.
Okagawa, F., "Glass Fiber Reinforced Rigid Polyurethane Foam", International Progress in Urethane, vol. 2, Lancaster, PA, Technomic Publishing Co., Inc., 1980.
Standard Practice for Polyurethane Raw Materials: Polyurethane Foam Cup Test, ASTM D7487-08, 2008.
International Search Report and Written Opinion issued in related International Application No. PCT/US2014/048465 dated Mar. 31, 2015.
Guhanathan, S. et al., "Studies on Castor Oil-based Polyurethane/ Polyacrylonitrile Interpenetrating Polymer Network for Toughening of Unsaturated Polyester Resin," Journal of Applied Polymer Science, 92:817-829 (2004).
Javni, I. et al., "Thermal Stability of Polyurethanes Based on Vegetable Oils," Journal of Applied Polymer Science, 77:1723-1734 (2000).
Nayak, P.L., "Natural Oil-Based Polymers: Opportunities and Challenges," J. Macro. Sci. Rev. Macro. Chem. & Phys., C40(1):1-21 (2000).
International Search Report and Written Opinion, dated Sep. 24, 2010 in International Application No. PCT/US2010/045466, 8 pages.
Co-pending, related U.S. Appl. No. 12/855,368, filed Aug. 12, 2010.
Anonymous. "Rigid polyurethane foams having a strut/window mass ratio in the range of 90/10 to 10/90, made via extrusion." Research Disclosure. Journal No. 40264, Published Oct. 1997.
Anonymous. "Cellular plastics made by extrusion." Research Disclosure. Journal No. 40204, Published Oct. 1997.
Szycher, Michael. 17.7.1 Foam Production by Extruder Method. Szycher's Handbook of Polyurethanes. pp. 17-21-17-22. Copyright 1999 by CRC Press LLC.
"Soya-based isocyanate alternatives coming? (us newslines)," Urethanes Technology, Apr. 1, 2007, abstract.
Department of Energy Techology, Defining "Low GWP", Published in KYLA+Varmepumpar #7 2013, Kungliga Teknisha Hogskolan, Sweden, Nov. 4, 2013.

\* cited by examiner

USE OF EVAPORATIVE COOLANTS TO MANUFACTURE FILLED POLYURETHANE COMPOSITES

FIELD OF THE DISCLOSURE

This disclosure relates generally to polyurethane composites, more particularly, using an evaporative coolant when forming polyurethane composites.

BACKGROUND OF THE DISCLOSURE

Polymeric composites that contain organic and/or inorganic filler materials have become desirable for a variety of uses because of their excellent mechanical properties and weathering stability. Foamed versions of these materials can have a relatively low density yet the filler materials can provide a composite material that is extremely strong. The polymer provided in the composite can help provide good toughness (i.e., resistance to brittle fracture) and resistance to degradation from weathering to the composite when it is exposed to the environment. Thus, polymeric composites including organic and/or inorganic fillers can be used in a variety of applications, including in building materials.

The use of polyurethane composites has grown over the last three decades. This can be attributed to their superior tensile strength, impact resistance, and abrasion resistance compared to, for example, unsaturated polyester and vinyl esters based composites. However, a persistent problem in making polyurethane composites is the exotherm within the polyurethane composite mixture which results from the reaction between the isocyanate and the hydroxyl groups in the reaction mixture. Excessive heat results in scorching or surface blemishes on the surface of molded product. In continuous molding processes, increasing the reactivity of the system such as by increasing catalyst has been used to reduce demolding times; however, the increased reactivity results in increased heat generation and thus an increase in surface blemishes.

SUMMARY OF THE DISCLOSURE

Polyurethane composites and methods of preparation are described herein. The methods of making the polyurethane composite can include mixing (1) at least one isocyanate selected from the group consisting of diisocyanates, polyisocyanates, and mixtures thereof, (2) at least one polyol, (3) an inorganic filler, and (4) an evaporative coolant in an extruder to form a mixture. The method can also include extruding the mixture into a mold cavity, generating heat in the mold cavity from the reaction of the at least one isocyanate and the at least one polyol, and allowing the evaporative coolant to migrate to an interface between the mixture and the interior mold surface. The temperature of the mixture causes evaporation of the evaporative coolant at the interface thereby removing heat at the interface. In some embodiments, the mixture can be extruded into a mold cavity of a continuous mold formed at least in part by opposing surfaces of two opposed belts and the interface can be formed between the mixture and an interior surface of one of the two opposed belts. The methods also include forming a molded article from the mold and removing the molded article from the mold.

Polyurethane composites are also described. The composite can comprise a polyurethane formed by the reaction of at least one isocyanate selected from the group consisting of diisocyanates, polyisocyanates and mixtures thereof and at least one polyol in the presence of an inorganic filler and an evaporative coolant, wherein the inorganic filler is present in an amount of from 40% to 90% by weight based on the total weight of the composite, and wherein the composite has a discontinuous cell structure.

Suitable evaporative coolants for use in the composites and the methods of making the polyurethane composites include hydrofluorocarbons, hydrochlorofluorocarbons, or a combination thereof. In some embodiments, the evaporative coolant has a boiling point of −30° C. to about 40° C. In some embodiments, the evaporative coolant is a liquid at 20° C. In some embodiments, the evaporative coolant is a gas at 20° C. Specific examples of evaporative coolants include pentafluoropropane and tetrafluoroethane.

The evaporative coolant can be present in the mixture in an amount of up to 25% by weight based on the total weight of the at least one polyol. In some embodiments, the evaporative coolant is present in the mixture in an amount of from 0.5% to 5% by weight based on the total weight of the at least one polyol.

The evaporative coolant can be combined, for example, with the at least one isocyanate or the at least one polyol prior to being mixed with the inorganic filler. The evaporative coolant may also be added separately at any stage of mixing or during reaction of the at least one isocyanate and at least one polyol. For example, the evaporative coolant can be added separately to the extruder.

The at least one polyol in the polyurethane composite can include 50% or more of one or more first polyols. In some embodiments, the one of more first polyols can each comprise a hydroxyl number of greater than 250 mg KOH/g. In some embodiments, the one of more first polyols can comprise 75% or more primary hydroxyl groups based on the total number of hydroxyl groups in the polyol. In some embodiments, the one or more first polyols can also comprise a primary hydroxyl number, defined as the hydroxyl number multiplied by the percentage of primary hydroxyl groups based on the total number of hydroxyl groups in the polyol, of greater than 250 mg KOH/g. In some embodiments, the one or more first polyols can include an aromatic polyester or polyether polyol.

In some embodiments, the amount of inorganic filler can be from 40% to 90% by weight, based on the weight of the mixture. Exemplary fillers include coal ash such as fly ash.

The polyurethane mixture can also contain water. In some embodiments, the mixture can include water in an amount of from greater than 0% to 5% by weight, based on the weight of the mixture. For example, in some embodiments, the amount of water in the mixture can be from 0.04 to 2% by weight, based on the weight of the mixture. In some embodiments, the amount of water in the mixture can be 0.5% by weight or less, based on the weight of the mixture.

In some embodiments, the molded article can have a discontinuous cell structure. In some embodiments, the density at the surface of the molded article is less than twice the density at the core of the molded article. In some embodiments, the molded article can have a density of 5 lb/ft$^3$ or greater. For example, the molded article can have a density of 20 lb/ft$^3$ to 60 lb/ft$^3$.

DETAILED DESCRIPTION

Polyurethane composites and methods of preparing polyurethane composites are described herein. The polyurethane composites can be formed using highly reactive systems such as highly reactive polyols, isocyanates, or both. For example, the composites can be formed by the reaction of at least one isocyanate, selected from the group consisting of diisocyanates, polyisocyanates, and mixtures thereof, and at least one polyol, in the presence of an inorganic filler and optionally, a catalyst. Isocyanates suitable for use in the polyurethane composite described herein include one or more monomeric or oligomeric poly- or di-isocyanates. The monomeric or oligomeric poly- or di-isocyanate include aromatic diisocyanates and polyisocyanates. The isocyanates can also be blocked isocyanates, or pre-polymer isocyanates (e.g., castor oil pre-polymer isocyanates and soy polyol pre-polymer isocyanates). An example of a useful diisocyanate is methylene diphenyl diisocyanate (MDI). Useful MDI's include MDI monomers, MDI oligomers, and mixtures thereof Further examples of useful isocyanates include those having NCO (i.e., the reactive group of an isocyanate) contents ranging from about 25% to about 35% by weight. Examples of useful isocyanates are found, for example, in *Polyurethane Handbook: Chemistry, Raw Materials, Processing Application, Properties,* 2$^{nd}$ Edition, Ed: Gunter Oertel; Hanser/Gardner Publications, Inc., Cincinnati, Ohio, which is herein incorporated by reference. Suitable examples of aromatic polyisocyanates include 2,4- or 2,6-toluene diisocyanate, including mixtures thereof p-phenylene diisocyanate; tetramethylene and hexamethylene diisocyanates; 4,4-dicyclohexylmethane diisocyanate; isophorone diisocyanate; 4,4-phenylmethane diisocyanate; polymethylene polyphenylisocyanate; and mixtures thereof In addition, triisocyanates may be used, for example, 4,4,4-triphenylmethane triisocyanate; 1,2,4-benzene triisocyanate; polymethylene polyphenyl polyisocyanate; methylene polyphenyl polyisocyanate; and mixtures thereof. Suitable blocked isocyanates are formed by the treatment of the isocyanates described herein with a blocking agent (e.g., diethyl malonate, 3,5-dimethylpyrazole, methylethylketoxime, and caprolactam). Isocyanates are commercially available, for example, from Bayer Corporation (Pittsburgh, Pa.) under the trademarks MONDUR and DESMODUR. Other examples of suitable isocyanates include MONDUR MR Light (Bayer Corporation; Pittsburgh, Pa.), PAPI 27 (Dow Chemical Company; Midland, Mich.), Lupranate M20 (BASF Corporation; Florham Park, N.J.), Lupranate M70L (BASF Corporation; Florham Park, N.J.), Rubinate M (Huntsman Polyurethanes; Geismar, La.), Econate 31 (Ecopur Industries), and derivatives thereof.

The average functionality of isocyanates useful with the composites described herein is between about 1.5 to about 5. Further, examples of useful isocyanates include isocyanates with an average functionality of about 2 to about 4.5, about 2.2 to about 4, about 2.4 to about 3.7, about 2.6 to about 3.4, and about 2.8 to about 3.2.

The at least one polyol for use in the polyurethane composite can include polyester polyols, polyether polyols, or combinations thereof In some embodiments, the at least one polyol can include 50% or more of one or more highly reactive (i.e., first) polyols. For example, the at least one polyol can include greater than 55%, greater than 60%, greater than 65%, greater than 70%, greater than 75%, greater than 80%, greater than 85%, greater than 90%, greater than 95%, or 100% of one or more highly reactive polyols.

In some embodiments, the one or more highly reactive polyols can include polyols having a hydroxyl number of greater than 250. For example, the hydroxyl number can be greater than 275, greater than 300, greater than 325, greater than 350, greater than 375, greater than 400, greater than 425, greater than 450, greater than 475, greater than 500, greater than 525, greater than 550, greater than 575, greater than 600, greater than 625, greater than 650, greater than 675, greater than 700, greater than 725, or greater than 750.

In some embodiments, the one or more highly reactive polyols can include polyols having a primary hydroxyl number of greater than 250. As used herein, the primary hydroxyl number is defined as the hydroxyl number multiplied by the percentage of primary hydroxyl groups based on the total number of hydroxyl groups in the polyol. For example, the primary hydroxyl number can be greater than 255, greater than 260, greater than 265, greater than 270, greater than 275, greater than 280, greater than 285, greater than 290, or greater than 295.

In some embodiments, the one or more highly reactive polyols include a large number of primary hydroxyl groups (e.g. 75% or more) based on the total number of hydroxyl groups in the polyol. For example, the highly reactive polyols can include 80% or more, 85% or more, 90% or more, 95% or more, or 100% of primary hydroxyl groups. The number of primary hydroxyl groups can be determined using fluorine NMR spectroscopy as described in ASTM D4273, which is hereby incorporated by reference in its entirety.

In some embodiments, the one or more highly reactive polyols can include a Mannich polyol. Mannich polyols are the condensation product of a substituted or unsubstituted phenol, an alkanolamine, and formaldehyde. Mannich polyols can be prepared using methods known in the art. For example, Mannich polyols can be prepared by premixing the phenolic compound with a desired amount of the alkanolamine, and then slowly adding formaldehyde to the mixture at a temperature below the temperature of Novolak formation. At the end of the reaction, water is stripped from the reaction mixture to provide a Mannich base. See, for example, U.S. Pat. No. 4,883,826, which is incorporated herein by reference in its entirety. The Mannich base can then be alkoxylated to provide a Mannich polyol.

The substituted or unsubstituted phenol can include one or more phenolic hydroxyl group. In certain embodiments, the substituted or unsubstituted phenol includes a single hydroxyl group bound to a carbon in an aromatic ring. The phenol can be substituted with substituents which do not undesirably react under the conditions of the Mannich condensation reaction, a subsequent alkoxylation reaction (if performed), or the preparation of polyurethanes from the final product. Examples of suitable substituents include alkyl (e.g., a $C_1$-$C_{18}$ alkyl, or a $C_1$-$C_{12}$ alkyl), aryl, alkoxy, phenoxy, halogen, and nitro groups.

Examples of suitable substituted or unsubstituted phenols that can be used to form Mannich polyols include phenol, o-, p-, or m-cresols, ethylphenol, nonylphenol, dodecylphenol, p-phenylphenol, various bisphenols including 2,2-bis(4-hydroxyphenyl)propane (bisphenol A), β-naphthol, β-hydroxyanthracene, p-chlorophenol, o-bromophenol, 2,6-dichlorophenol, p-nitrophenol, 4- or 2-nitro-6-phenylphenol, 2-nitro-6- or 4-methylphenol, 3,5-dimethylphenol, p-isopropylphenol, 2-bromo-6-cyclohexylphenol, and combinations thereof. In some embodiments, the Mannich polyol is derived from phenol or a monoalkyl phenols (e.g., a para-alkyl phenols). In some embodiments, the Mannich polyol is derived from a substituted or unsubstituted phenol selected from the group consisting of phenol, para-n-nonylphenol, and combinations thereof.

The alkanolamine used to produce the Mannich polyol can include a monoalkanolamine, a dialkanolamine, or combinations thereof. Examples of suitable mono alkanolamines include methylethanolamine, ethylethanolamine, methylisopropanolamine, ethylisopropanolamine, methyl-2-hydroxybutylamine, phenylethanolamine, ethanolamine, isopropanolamine, and combinations thereof. Exemplary dialkanolamines include diisopropanolamine, ethanolisopropanolamine, ethanol-2-hydroxybutylamine, isopropanol-2-hydroxybutylamine, isopropanol-2-hydroxyhexylamine, ethanol-2-hydroxyhexylamine, and combinations thereof. In certain embodiments, the alkanolamine is selected from the group consisting of diethanolamine, diisopropanolamine, and combinations thereof.

Any suitable alkylene oxide or combination of alkylene oxides can be used to form the Mannich polyol. In some embodiments, the alkylene oxide is selected from the group consisting of ethylene oxide, propylene oxide, butylene oxide, and combinations thereof. In certain embodiments, the Mannich polyol is alkoxylated with from 100% to about 80% propylene oxide and from 0 to about 20 wt. % ethylene oxide.

Mannich polyols are known in the art, and include, for example, ethylene and propylene oxide-capped Mannich polyols sold under the trade names CARPOL® MX-425 and CARPOL® MX-470 (Carpenter Co., Richmond, Va.).

In some embodiments, the one or more first polyols can include an aromatic polyester, an aromatic polyether polyol, or a combination thereof. In some embodiments, the one or more first polyols include an aromatic polyester polyol such as those sold under the TEROL® trademark (e.g., TEROL® 198).

Examples of highly reactive polyols also include Pel-Soy 744 and Pel-Soy P-750, soybean oil based polyols commercially available from Pelron Corporation; Agrol Diamond, a soybean oil based polyol commercially available from BioBased Technologies; Ecopol 122, Ecopol 131 and Ecopol 132, soybean oil polyols formed using polyethylene terephthalate and commercially available from Ecopur Industries; Stepanpol PD-110 LV and PS 2352, polyols based on soybean oil, diethylene glycol and phthallic anhydride and commercially available from Stepan Company; Voranol 280, 360 and WR2000, polyether polyols commercially available from Dow Chemical Company; Honey Bee HB-530, a soybean oil-based polyol commercially available from MCPU Polymer Engineering; Renewpol, commercially available from Styrotech Industries (Brooklyn Park, MN); JeffAdd B 650, a 65% bio-based content (using ASTM D6866-06) additive based on soybean oil commercially available from Huntsman Polyurethanes; Jeffol SG 360, a sucrose and glycerin-based polyol commercially available from Huntsman Polyurethanes; and derivatives thereof. For example, Ecopol 131 is a highly reactive aromatic polyester polyol comprising 80% primary hydroxyl groups, a hydroxyl number of 360-380 mg KOH/g, i.e., and a primary hydroxyl number of 288-304 mg KOH/g.

The at least one polyol for use in the polyurethane composites can include one or more plant-based polyols or non plant-based polyols. In some embodiments, the plant-based polyols are highly reactive polyols. The one or more plant-based polyols useful in the polyurethane composites can include polyols containing ester groups that are derived from plant-based fats and oils. Accordingly, the one or more plant-based polyols can contain structural elements of fatty acids and fatty alcohols. Starting materials for the plant-based polyols of the polyurethane component can include fats and/or oils of plant-based origin with preferably unsaturated fatty acid residues. The one or more plant-based polyols useful with the polyurethane composites include, for example, castor oil, coconut oil, corn oil, cottonseed oil, lesquerella oil, linseed oil, olive oil, palm oil, palm kernel oil, peanut oil, sunflower oil, tall oil, and mixtures thereof.

In some embodiments, the one or more polyols include a less reactive polyol. For example, the polyurethane composite can be produced from one or more less reactive polyols in addition to one or more highly reactive polyols. Less reactive polyols can have lower hydroxyl numbers, lower numbers of primary hydroxyl groups and/or lower primary hydroxyl numbers than the highly reactive polyols. In some embodiments, the less reactive polyols can have hydroxyl numbers of less than 250, less than 225, less than 200, less than 175, less than 150, less than 125, less than 100, less than 80, less than 60, less than 40, or even less than 20. In some embodiments, the less reactive polyols have about 50% or less primary hydroxyl groups, about 40% or less primary hydroxyl groups, about 30% or less primary hydroxyl groups, about 20% or less primary hydroxyl groups, or even about 10% or less primary hydroxyl groups. In some embodiments, the less reactive polyols can have primary hydroxyl numbers of less than about 220, less than about 200, less than about 180, less than about 160, less than about 140, less than about 120, less than about 100, less than about 80, less than about 60, less than about 40, or even less than about 20. Suitable less reactive polyols include castor oil; Stepanpol PS-2052A (commercially available from the Stepan Company); Agrol2.0, 3.6, 4.3, 5.6 and 7.0 (plant-based polyols commercially available from BioBased Technologies); Ecopol 123 and Ecopol 124, which are commercially available from Ecopur Industries; Honey Bee HB-150 and HB-230, soybean oil-based polyols commercially available from MCPU Polymer Engineering; Terol 1154, commercially available from Oxid (Houston, Tex.); Multranol 3900, Multranol 3901, Arcol 11-34, Arcol 24-32, Arcol 31-28, Arcol E-351, Arcol LHT-42, and Arcol LHT -112, commercially available from Bayer; and Voranol 220-028, 220-094, 220-110N, 222-056, 232-027, 232-034, and 232-035, commercially available from Dow.

The at least one polyol can include 50% or less of one or more less reactive polyols in addition to the one or more highly reactive polyols. For example, the at least one polyol can include less than 45%, less than 40%, less than 35%, less than 30%, less than 25%, less than 20%, less than 15%, less than 10%, or less than 5%, of one or more less reactive polyols. The at least one polyol for use in the disclosure can have an average functionality of 1.5 to 8.0, 1.6 to 6.0, 1.8 to 4.0, 2.5 to 3.5, or 2.6 to 3.1. The average hydroxyl number values (as measured in units of mg KOH/g) for the at least one polyol can be from about 100 to 600, 150 to 550, 200 to 500, 250 to 440, 300 to 415, and 340 to 400.

The polyurethane composites can include more than one type of polyol. The one or more polyols can be combined in various percentages, e.g., 15-40% of a less reactive polyol and 60-85% of a highly reactive polyol.

The polyurethane systems used to form the composite materials described herein can include one or more additional isocyanate-reactive monomers in addition to the at least one polyol. The one or more additional isocyanate-reactive monomers can include, for example, amine and optionally hydroxyl groups.

In some embodiments, the one or more additional isocyanate-reactive monomers can include a polyamine. The first isocyanate-reactive monomer can comprise a polyamine. Any suitable polyamine can be used. Suitable polyamines can correspond to the polyols described herein (for example, a polyester polyol or a polyether polyol), with the exception that the terminal hydroxy groups are converted to amino groups, for example by amination or by reacting the hydroxy groups with a diisocyanate and subsequently hydrolyzing the terminal isocyanate group to an amino group. By way of example, the polyamine can be polyether polyamine, such as polyoxyalkylene diamine or polyoxyalkylene triamine. Polyether polyamines are known in the art, and can be prepared by methods including those described in U.S. Pat. No. 3,236,895 to Lee and Winfrey. Exemplary polyoxyalkylene diamines are commercially available, for example, from Huntsman Corporation under the trade names Jeffamine® D-230, Jeffamine® D-400 and Jeffamine® D-2000. Exemplary polyoxyalkylene triamines are commercially available, for example, from Huntsman Corporation under the trade names Jeffamine® T-403, Jeffamine® T-3000, and Jeffamine® T-5000.

In some embodiments, the additional isocyanate-reactive monomer can include an alkanolamine. The alkanolamine can be a dialkanolamine, a trialkanolamine, or a combination thereof. Suitable dialkanolamines include dialkanolamines which include two hydroxy-substituted $C_1$-$C_{12}$ alkyl groups (e.g., two hydroxy-substituted $C_1$-$C_8$ alkyl groups, or two hydroxy-substituted $C_1$-$C_6$ alkyl groups). The two hydroxy-substituted alkyl groups can be branched or linear, and can be of identical or different chemical composition. Examples of suitable dialkanolamines include diethanolamine, diisopropanolamine, ethanolisopropanolamine, ethanol-2-hydroxybutylamine, isopropanol-2-hydroxybutylamine, isopropanol-2-hydroxyhexylamine, ethanol-2-hydroxyhexylamine, and combinations thereof. Suitable trialkanolamines include trialkanolamines which include three hydroxy-substituted $C_1$-$C_{12}$ alkyl groups (e.g., three hydroxy-substituted $C_1$-$C_8$ alkyl groups, or three hydroxy-substituted $C_1$-$C_6$ alkyl groups). The three hydroxy-substituted alkyl groups can be branched or linear, and can be of identical or different chemical composition. Examples of suitable trialkanolamines include triisopropanolamine (TIPA), triethanolamine, N,N-bis(2-hydroxyethyl)-N-(2-hydroxypropyl)amine (DEIPA), N,N-bis(2-hydroxypropyl)-N-(hydroxyethyl)amine (EDIPA), tris(2-hydroxybutyl)amine, hydroxyethyl di(hydroxypropyl)amine, hydroxypropyl di(hydroxyethyl)amine, tri(hydroxypropyl)amine, hydroxyethyl di(hydroxy-n-butyl)amine, hydroxybutyl di(hydroxypropyl)amine, and combinations thereof.

In some embodiments, the additional isocyanate-reactive monomer can comprise an adduct of an alkanolamine described above with an alkylene oxide. The resulting amine-containing polyols can be referred to as alkylene oxide-capped alkanolamines. Alkylene oxide-capped alkanolamines can be formed by reacting a suitable alkanolamine with a desired number of moles of an alkylene oxide. Any suitable alkylene oxide or combination of alkylene oxides can be used to cap the alkanolamine. In some embodiments, the alkylene oxide is selected from the group consisting of ethylene oxide, propylene oxide, butylene oxide, and combinations thereof. Alkylene oxide-capped alkanolamines are known in the art, and include, for example, propylene oxide-capped triethanolamine sold under the trade names CARPOL® TEAP-265 and CARPOL® TEAP-335 (Carpenter Co., Richmond, Va.).

In some embodiments, the additional isocyanate-reactive monomer can include an alkoxylated polyamine (i.e., alkylene oxide-capped polyamines) derived from a polyamine and an alkylene oxide. Alkoxylated polyamine can be formed by reacting a suitable polyamine with a desired number of moles of an alkylene oxide. Suitable polyamines include monomeric, oligomeric, and polymeric polyamines. In some cases, the polyamines has a molecular weight of less than 1000 g/mol (e.g., less than 800 g/mol, less than 750 g/mol, less than 500 g/mol, less than 250 g/mol, or less than 200 less than 200 g/mol). Examples of suitable polyamines that can be used to form alkoxylated polyamines include ethylenediamine, 1,3-diaminopropane, putrescine, cadaverine, hexamethylenediamine, 1,2-diaminopropane, o-phenylenediamine, m-phenylenediamine, p-phenylenediamine, spermidine, spermine, norspermidine, toluene diamine, 1,2-propane-diamine, diethylenetriamine, triethylenetetramine, tetraethylene-pentamine (TEPA), pentaethylenehexamine (PEHA), and combinations thereof.

Any suitable alkylene oxide or combination of alkylene oxides can be used to cap the polyamine. In some embodiments, the alkylene oxide is selected from the group consisting of ethylene oxide, propylene oxide, butylene oxide, and combinations thereof. Alkylene oxide-capped polyamines are known in the art, and include, for example, propylene oxide-capped ethylene diamine sold under the trade name CARPOL® EDAP-770 (Carpenter Co., Richmond, Va.) and ethylene and propylene oxide-capped ethylene diamine sold under the trade name CARPOL® EDAP-800 (Carpenter Co., Richmond, Va.).

The additional isocyanate-reactive monomer (when used) can be present in varying amounts relative the at least one polyol used to form the polyurethane. In some embodiments, the additional isocyanate-reactive monomer can be present in an amount of 30% or less, 25% or less, 20% or less, 15% or less, 10% or less, or 5% or less by weight based on the weight of the at least one polyol.

As indicated herein, in the polyurethane composites, an isocyanate is reacted with a polyol (and any additional isocyanate-reactive monomers) to produce the polyurethane formulation. In general, the ratio of isocyanate groups to the total isocyanate reactive groups, such as hydroxyl groups, water and amine groups, is in the range of about 0.5:1 to about 1.5:1, which when multiplied by 100 produces an isocyanate index between 50 and 150. Additionally, the isocyanate index can be from about 80 to about 120, from about 90 to about 120, from about 100 to about 115, or from about 105 to about 110. As used herein, an isocyanate may be selected to provide a reduced isocyanate index, which can be reduced without compromising the chemical or mechanical properties of the composite material.

As described herein, the polyurethane composites include a polyurethane formed by the reaction of at least one isocyanate and at least one polyol in the presence of an inorganic filler. The inorganic filler can be an ash, ground/recycled glass (e.g., window or bottle glass); milled glass; glass spheres; glass flakes; activated carbon; calcium carbonate; aluminum trihydrate (ATH); silica; sand; ground sand; silica fume; slate dust; crusher fines; red mud; amorphous carbon (e.g., carbon black); clays (e.g., kaolin); mica; talc; wollastonite; alumina; feldspar;

bentonite; quartz; garnet; saponite; beidellite; granite; calcium oxide; calcium hydroxide; antimony trioxide; barium sulfate; magnesium oxide; titanium dioxide; zinc carbonate; zinc oxide; nepheline syenite; perlite; diatomite; pyrophillite; flue gas desulfurization (FGD) material; soda ash; trona; and mixtures thereof. The ash can be a coal ash or another type of ash such as those produced by firing fuels including industrial gases, petroleum coke, petroleum products, municipal solid waste, paper sludge, wood, sawdust, refuse derived fuels, switchgrass or other biomass material. The coal ash can be fly ash, bottom ash, or combinations thereof. In some examples, the inorganic filler used is fly ash. Fly ash is produced from the combustion of pulverized coal in electrical power generating plants. The fly ash useful with the composite materials described herein can be Class C fly ash, Class F fly ash, or a mixture thereof. Fly ash produced by coal-fueled power plants is suitable for incorporation in the composites described herein.

The inorganic filler is present in the polyurethane composites described herein in amounts from 40% to 90% by weight. In some embodiments, the inorganic filler can be present in amounts from 60% to 85% by weight. Examples of the amount of inorganic filler present in the composites described herein include 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, or 90%.

In addition to an inorganic filler, the composite can include an organic filler, such as a recycled polymeric material. Suitable examples include pulverized polymeric foam or recycled rubber material.

In some embodiments, inorganic fibers or organic fibers can be included in the polyurethane composite, e.g., to provide increased strength, stiffness or toughness. Fibers suitable for use with the polyurethane composite described herein can be provided in the form of individual fibers, fabrics, rovings, or tows. These can be added prior to polymerization and can be chopped before or during the mixing process to provide desired fiber lengths. Alternately, the fibers can be added after polymerization, for example, after the composite mixture exits the mixing apparatus. The fibers can be from 3 to 50 mm in length. The fibers can be provided in a random orientation or can be axially oriented. The fibers can be coated with a sizing to modify performance to make the fibers reactive. Exemplary fibers include glass, polyvinyl alcohol (PVA), carbon, basalt, wollastonite, and natural (e.g., bamboo or coconut) fibers.

The inclusion of fillers in the polyurethane composite as described herein can modify and/or improve the chemical and mechanical properties of the composite. For example, the optimization of various properties of the composite allows their use in building materials and other structural applications.

One or more catalysts can be added to facilitate curing and can be used to control the curing time of the polymer matrix. Examples of useful catalysts include amine-containing catalysts (such as DABCO, tetramethylbutanediamine, and diethanolamine) and tin-, mercury-, and bismuth-containing catalysts. In some embodiments, 0.01 wt % to 2 wt % catalyst or catalyst system (e.g., 0.025 wt % to 1 wt %, 0.05 wt % to 0.5 wt %, or 0.1 wt% to about 0.25 wt%) can be used.

The reaction between the at least one polyol and the at least one isocyanate is extremely exothermic. For each mole of the isocyanate functional group, up to 25 kcal of energy is emitted from the reaction. It is difficult for the heat to diffuse in a molded environment. The excessive heat can cause scorching, blemishes, and/or other issues associated with the highly reactive polyurethane systems on the surface of molded products. It has been discovered that the use of an evaporative coolant can reduce blemishes in molded polyurethane composites.

The evaporative coolant can be inert. "Inert" as used herein refers to a compound that does not react with the materials used to form the polyurethane composite, or any other material present, under the conditions to be employed.

Evaporative coolants suitable for use in making the polyurethane composite include inert compounds that have a boiling point (at atmospheric pressure) up to and including 80° C., i.e., that evaporate at temperatures greater than 80° C. In particular, the evaporative coolant can have a boiling point 80° C. or less, for example, 75° C. or less, 70° C. or less, 65° C. or less, 60° C. or less, 55° C. or less, 50° C. or less, 45° C. or less, 40° C. or less, 35° C. or less, 30° C. or less, 25° C. or less, 20° C. or less, 15° C. or less, 10° C. or less, or 5° C. or less can be suitable for use as an evaporative coolant in the polyurethane composites. In some embodiments, the evaporative coolant has a boiling point of −30° C. or greater, −25° C. or greater, −20° C. or greater, −15° C. or greater, −10° C. or greater, 5° C. or greater, or 0° C. or greater. The evaporative coolant can have a boiling point of from −30° C. to 40° C., for example, from −30° C. to 35° C., −30° C. to 30° C., −30° C. to 15° C., −20° C. to 10° C., −20° C. to 5° C., −20° C. to 0° C., −20° C. to −5° C., −15° C. to 35° C., −10° C. to 35° C., −5° C. to 35° C., −0° C. to 35° C., 5° C. to 35° C., 10° C. to 35° C., 15° C. to 35° C., −10° C. to 30° C., −15° C. to 25° C., −15° C. to 20° C., −15° C. to 15° C., −15° C. to 10° C., −15° C. to 5° C., −10° C. to 30° C., −10° C. to 25° C., −10° C. to 20° C., −10° C. to 15° C., −10° C. to 10° C., −5° C. to 30° C., −5° C. to 25° C., −5° C. to 20° C., −5° C. to 15° C., 0° C. to 30° C., 0° C. to 25° C., or 0° C. to 20° C. In some embodiments, the evaporative coolant can have a boiling point of from −26° C. to 27° C.

In some embodiments, the evaporative coolant can be a liquid at room temperature, e.g., at 20° C., and at atmospheric pressure. In some embodiments, the evaporative coolant can be a gas at room temperature and atmospheric pressure.

Representative examples of suitable evaporative coolants can include, but are not limited to, any aliphatic, cyclic, branched, aromatic, or substituted C1 to C10, for example, C1, C2, C3, C4, C5, C6, C7, C8, C9 or C10 hydrofluorocarbons, hydrochlorofluorocarbons, hydrocarbons, alkyl halides, ketones, alcohols, dialkyl ethers, alkyl alkanoates, fluorocarbons, chlorofluorocarbons, hydrochlorocarbons, fluoroethers, or mixtures thereof.

Specific examples of hydrofluorocarbons and hydrochlorofluorocarbons suitable for use as an evaporative coolant include, but are not limited to, dichlorotrifluoroethane, chlorodifluoromethane, pentafluoropropane, chlorotetrafluoroethane, tetrafluoroethane, fluoroform, pentatetrafluoropropane, nonafluorobutane, octafluorobutane, undecafluoropentane, methyl fluoride, difluoromethane, ethyl fluoride, difluoroethane, trifluoroethane, difluoroethene, trifluoroethene, fluoroethene, pentafluoropropene, tetrafluoroethane, tetrafluoropropene, trifluoropropene, difluoropropene, heptafluorobutene, hexafluorobutene, nonafluoropentene, chlorofluoromethane, chloromethane, dichlorofluoromethane, chlorotrifluoroethane, chlorodifluoroethane, chlorofluoroethane, chloroethane, dichlorodifluoroethane, dichlorofluoroethane, dichloroethane, trichlorofluoroethane, trichlorodifluoroethane, trichloroethane, tetrachlorofluoroethane, chloroethene, dichloroethene, dichlorofluoroethene, dichlorodifluoroethene, and mixtures thereof. In some embodiments the evaporative coolant includes pentafluoropropane. In some embodiments the evaporative coolant includes tetrafluoroethane.

The evaporative coolant can also be a blend of a hydrofluorocarbon and/or a hydrochlorofluorocarbon. Suitable blends of hydrofluorocarbon and/or hydrochlorofluorocarbon include, but not limited to, pentafluoroethane, tetrafluoroethane, and isobutene; difluoromethane, pentafluoroethane, and tetrafluoroethane; pentafluoroethane, trifluoroethane, and chlorodifluoromethane; difluoromethane, pentafluoroethane, and tetrafluoroethane; chlorodifluoromethane, difluoroethane, and chlorotetrafluoroethane; chlorodifluoromethane, chlorotetrafluoroethane, and chlorodifluoroethane. Evaporative coolants are commercially available, for example, from Honeywell International Inc. under the trademark Genetron®, AZ-20®, and AZ-50®; from Arkema under the trademark Forane®; from Carrier Corporation under the trademark Puron®; from INEOS Fluor Holdings Ltd. under the trademark Klea®; and from E.I. duPont de Nemours and Company under the trademark Suva® and Freon®.

Specific examples of fluorocarbons suitable for use as the evaporative coolant include, but are not limited to, tetrafluoromethane, perfluoroethane, perfluoropropane, perfluorobutane, perfluoropentane, perfluoroethene, perfluoropropene, perfluorobutene, perfluoropentene, hexafluorocyclopropane, and octafluorocyclobutane.

Specific examples of fluoroethers suitable for use as the evaporative coolant include, but are not limited to, trifluoromethyoxy-perfluoromethane, difluoromethoxy-perfluoromethane, fluoromethoxy-perfluoromethane, di fluoromethoxy-di fluoromethane, difluoromethoxy-perfluoroethane, difluoromethoxy-1,2,2,2-tetrafluoroethane, difluoromethoxy-1,1,2,2-tetra-fluoroethane, perfluoroethoxy-fluoromethane, perfluoro-methoxy-1,1,2-trifluoroethane, perfluoromethoxy-1,2,2-trifluoroethane, cyclo-1,1,2,2-tetrafluoropropylether, cyclo-1,1,3,3-tetrafluoropropylether, perfluoromethoxy-1,1,2,2-tetrafluoroethane, cyclo-1,1,2,3, 3-pentafluoropropylether, perfluoromethoxy-perfluoroacetone, perfluoromethoxy-perfluoroethane, perfluoromethoxy-1,2,2,2-tetrafluoroethane, perfluoromethoxy-2, 2,2-trifluoroethane, cyclo-perfluoromethoxy-perfluoroacetone, and cyclo-perfluoropropylether, bis-(trifluoromethyl) ether, trifluoromethyl difluoromethyl ether, methyl fluoromethyl ether, methyl trifluoromethyl ether, bis-(difluoromethyl) ether, fluoromethyl difluoromethyl ether, methyl difluoromethyl ether, bis-(fluoromethyl) ether, 2,2,2-trifluoroethyl difluoromethyl ether, pentafluoroethyl trifluoromethyl ether, pentafluoroethyl difluoromethyl ether, 1,1,2,2-tetrafluoroethyl difluoromethyl ether, 1,2,2,2-tetrafluoroethyl fluoromethyl ether, 1,2,2-trifluoroethyl difluoromethyl ether, 1,1-difluoroethyl methyl ether, and 1,1,1,3, 3,3-hexafluoroprop-2-ylfluoromethyl ether.

Specific examples of hydrocarbons suitable for use as the evaporative coolant include, but are not limited to, lower aliphatic or cyclic hydrocarbons such as n-pentane, isopentane, cyclopentane, neopentane, hexane and cyclohexane.

Specific examples of dialkyl ethers suitable for use as the evaporative coolant include, but are not limited to, dialkyl ethers having from 2 to 6 carbon atoms. For example, dimethyl ether, methyl ethyl ether, diethyl ether, methyl propylether, methyl isopropyl ether, ethyl propyl ether, ethyl isopropyl ether, dipropyl ether, propyl isopropyl ether, diisopropyl ether, methyl butyl ether, methyl isobutyl ether, methyl t-butyl ether, ethyl butyl ether, ethyl isobutyl ether and ethyl t-butyl ether are suitable for use as evaporative coolants.

Specific examples of alkyl alkanoates suitable for use as the evaporative coolant include, but are not limited to, methyl formate, methyl acetate, ethyl formate and ethyl acetate. Specific examples of ketones suitable for use as the evaporative coolant include, but are not limited to, acetone and methyl ethyl ketone.

In some embodiments, the evaporative coolant can soluble in either a polyol or an isocyanate used to produce the polyurethane composite mixture, or can be soluble in the polyurethane composite mixture. In some embodiments, the evaporative coolant is insoluble in the composite mixture.

The evaporative coolant can be present in the mixture used to form the polyurethane composites in amounts from 0.1% to 25% by weight based on the total weight of the at least one polyol. For example, the evaporative coolant can be present in the mixture in an amount of 0.5% to 20%, 0.5% to 15%, 0.5% to 10%, 0.5% to 5%, 1% to 20%, 1% to 15%, or 1% to 5%, by weight based on the total weight of the at least one polyol. In some embodiments, the evaporative coolant can be present in the mixture in an amount of 0.1%, 0.2%, 0.3%, 0.4%, 0.5%, 0.6%, 0.7%, 0.8%, 0.9%, 1%, 1.5%, 2%, 2.5%, 3%, 3.5%, 4%, 4.5%, 5%, 5.5%, 6%, 7%, 8%, 9%, 10%, 11%, 12%, 13%, 14%, 15%, 16%, 17%, 18%, 19%, or 20% by weight based on the total weight of the at least one polyol.

Additional components useful with the polyurethane composite include foaming agents, blowing agents, surfactants, chain-extenders, crosslinkers, coupling agents, UV stabilizers, fire retardants, antimicrobials, anti-oxidants, and pigments. Though the use of such components is well known to those of skill in the art, some of these additional additives are further described herein.

Chemical foaming agents include azodicarbonamides (e.g., Celogen manufactured by Lion Copolymer Geismar); and other materials that react at the reaction temperature to form gases such as carbon dioxide. Water is an exemplary foaming agent that reacts with isocyanate to yield carbon dioxide. The presence of water as an added component or in the filler also can result in the formation of polyurea bonds through the reaction of the water and isocyanate. In some embodiments, water may be present in the mixture in an amount of from greater than 0% to 5% by weight or less, based on the weight of the mixture. In some embodiments, water may be present in the mixture in an amount of from 0.02%, 0.03%, 0.04%, 0.05%, 0.10%, 0.15%, 0.2%, 0.25%, 0.3%, 0.4%, 0.5%, 0.6%, 0.7%, 0.8%, 0.9%, 1%, 1.2%, 1.5%, or 1.6%, 1.7%, 1.8%, 1.9%, or 2%, by weight, based on the weight of the mixture. For example, the water can be present in a range of 0.02% to 4%, 0.05% to 3%, 0.1% to 2%, or 0.2% to 1% by weight, based on the weight of the mixture. In some embodiments, the water is present from 0.04% to 2% or from 0.02% to 0.5% by weight, based on the weight of the mixture.

Surfactants can be used as wetting agents and to assist in mixing and dispersing the inorganic particulate material in a composite. Surfactants can also stabilize and control the size of bubbles formed during the foaming event and the resultant cell structure. Surfactants can be used, for example, in amounts below about 0.5 wt % based on the total weight of the mixture. Examples of surfactants useful with the polyurethanes described herein include anionic, non-ionic and cationic surfactants. For example, silicone surfactants such as Tegostab B-8870, DC-197 and DC-193 (Air Products; Allentown, Pa.) can be used.

Low molecular weight reactants such as chain-extenders and/or crosslinkers can be included in the composite described herein. These reactants help the polyurethane system to distribute and contain the inorganic filler and/or fibers within the composite. Chain-extenders are difunctional molecules, such as diols or diamines, that can polymerize to lengthen the urethane polymer chains. Examples of chain-extenders include ethylene glycol; 1,4-butanediol; ethylene diamine, 4,4'-methylenebis(2-chloro aniline) (MBOCA); diethyltoluene diamine (DETDA); and aromatic diamines such as Unilink 4200 (commercially available from UOP). Crosslinkers are tri- or greater functional molecules that can integrate into a polymer chain through two functionalities and provide one or more further functionalities (i.e., linkage sites) to crosslink to additional polymer chains. Examples of crosslinkers include glycerin, trimethylolpropane, sorbitol, diethanolamine, and triethanolamine. In some composites, a crosslinker or chain-extender may be used to replace at least a portion of the at least one polyol in the composite material. For example, the polyurethane can be formed by the reaction of an isocyanate, a polyol, and a crosslinker.

Coupling agents and other surface treatments such as viscosity reducers, flow control agents, or dispersing agents can be added directly to the filler or fiber, or incorporated prior to, during, and/or after the mixing and reaction of the composite material. Coupling agents can allow higher filler loadings of an inorganic filler such as fly ash and may be used in small quantities. For example, the composite material may comprise about 0.01 wt % to about 0.5 wt % of a coupling agent. Examples of coupling agents useful with the composite materials described herein include Ken-React LICA 38 and KEN-React KR 55 (Kenrich Petrochemicals; Bayonne, N.J.). Examples of dispersing agents useful with the composite materials described herein include JEFFSPERSE X3202, JEFFSPERSE X3202RF, and JEFFSPERSE X3204 (Huntsman Polyurethanes; Geismar, La.).

Ultraviolet light stabilizers, such as UV absorbers, can be added to the composite materials described herein. Examples of UV light stabilizers include hindered amine type stabilizers and opaque pigments like carbon black powder. Fire retardants can be included to increase the flame or fire resistance of the composite material. Antimicrobials can be used to limit the growth of mildew and other organisms on the surface of the composite. Antioxidants, such as phenolic antioxidants, can also be added. Antioxidants provide increased UV protection, as well as thermal oxidation protection.

Pigments or dyes can optionally be added to the composite materials described herein. An example of a pigment is iron oxide, which can be added in amounts ranging from about 2 wt % to about 7 wt %, based on the total weight of the composite material.

The polymer composite can be produced by mixing the at least one isocyanate, the at least one polyol, the inorganic filler, and optionally a catalyst, in a mixing apparatus such as a high speed mixer or an extruder. In some embodiments, mixing can be conducted in an extruder.

The reactants and other materials can be added in any suitable order. For example, in some embodiments, the mixing stage of the method used to prepare the polyurethane composite includes: (1) mixing the polyol and inorganic filler; (2) mixing the isocyanate with the polyol and the inorganic filler; and optionally (3) mixing the catalyst with the isocyanate, the polyol, and the inorganic filler. In some embodiments, the mixing step of the method used to prepare the polyurethane composite includes mixing the liquid ingredients (i.e., the polyol, isocyanate, catalyst, surfactants, and water) and then combining the mixed liquid ingredients with the inorganic filler and optional fiber.

The evaporative coolant can be combined with any of the material used to form the polyurethane composite prior to, during, or after mixing. For example, in some embodiments, the evaporative coolant can be combined with the at least one polyol prior to said mixing step and, in some embodiments, can be soluble in the at least one polyol. In some embodiments, the evaporative coolant can be combined with the at least one isocyanate prior to said mixing step and, in some embodiments, can be soluble in the at least one isocyanate. In some embodiments, the evaporative coolant can be mixed with the polyol and inorganic filler. In some embodiments, the evaporative coolant can be mixed with the polyol, inorganic filler, and isocyanate. In some embodiments, the evaporative coolant can be mixed with the polyol, inorganic filler, isocyanate, and catalyst. In some embodiments, the evaporative coolant can be mixed with the liquid ingredients (i.e., the polyol, isocyanate, surfactants, and water) before the addition of the inorganic filler and optional fiber. In some embodiments, the evaporative coolant is added separately, e.g., the evaporative coolant can be metered into the extruder. For example, the evaporative coolant can be added at any point in the extruder or mixer such as after the other materials are added to the extruder or mixer.

The evaporative coolant can be combined with the composite mixture as a liquid below, at, or slightly above room temperature. In some embodiments, the evaporative coolant can be a gas and added to the composite mixture in that form, or compressed so that it can be added as a liquid.

The evaporative coolant can be combined with the polyurethane mixture prior to or during reaction of the polyol, the isocyanate, and any optional isocyanate-reactive monomers. In some embodiments, the evaporative coolant is combined with the polyol, the isocyanate, the inorganic filler and optional fiber prior to the reaction to form a polyurethane. In some embodiments, the evaporative coolant is combined with the polyol, the isocyanate, the inorganic filler and optional catalyst and/or fiber during the polyurethane reaction. The evaporative coolant can be added in a single step or added continuously to the composite mixture.

The polyurethane composite mixture can be blended in any suitable manner to obtain a homogeneous or heterogeneous blend of the at least one isocyanate, at least one polyol, inorganic filler, evaporative coolant, and optional catalyst. An ultrasonic device can be used for enhanced mixing and/or wetting of the various components of the polyurethane composite. Such enhanced mixing and/or wetting can allow a high concentration of filler to be mixed with the polyurethane matrix. The ultrasonic device produces an ultrasound of a certain frequency that can be varied during the mixing and/or extrusion process. The ultrasonic device useful in the preparation of composite materials described herein can be attached to or adjacent to an extruder and/or mixer. For example, the ultrasonic device can be attached to a die or nozzle or to the port of an extruder or mixer. An ultrasonic device may provide de-aeration of undesired gas bubbles and better mixing for the other components, such as blowing agents, surfactants, and catalysts.

The mixture can then be extruded into a mold cavity of a mold, the mold cavity formed by at least an interior mold surface. The mold can be a continuous forming system such as a belt molding system or can include individual batch molds. The belt molding system can include a mold cavity formed at least in part by opposing surfaces of two opposed belts. A molded article can then be formed followed by removal of the article from the mold.

The at least one isocyanate and the at least one polyol can begin to react in the extruder or once they leave the extruder (i.e., in the mold). As at least a portion of the reaction occurs in the mold, the reaction generates heat in the mold cavity. The evaporative coolant migrates to an interface between the mixture and the interior mold surface. As the temperature of the mixture is above the boiling point of the evaporative coolant, the temperature of the mixture causes evaporation of the evaporative coolant at the interface thereby removing energy in the form of heat at the interface. The removal of energy at the interface can create a cooling effect along the interior mold surface and this localized cooling can reduce the formation of blemishes or other defects on the surface of the molded product. The use of the evaporative coolant also allows for the incorporation of a texture or design (from the interior molding surface) onto the surface of the molded article. The reduction of blemishes can occur even though the temperature may continue to rise along the mold cavity as the polyurethane reaction continues. In embodiments where the evaporative coolant is metered alone into the extruder or mixer, the amount of evaporative coolant can be adjusted "on the fly," which has the added benefit of using the evaporative coolant to compensate for temperature variation in the polyurethane mixture.

The molded articles described herein when formed can include at least one surface that is in physical contact with an interior mold surface and a core (at the center of the molded article). In some embodiments, the molded articles do not comprise a skin. Polyurethane composites comprising a skin are materials with a low density foamed core surrounded by a nearly solid skin (high density) of the same material and are typically formed by polymerization of a monomer mixture in the presence of a blowing agent. In some embodiments, the increase in mold temperature resulting from the polyurethane reaction causes the molds to become flexible and, as a result, the volume of the composite in the mold is not sufficiently constrained to cause the creation of a skin (as opposed to rigid molds that constrain the molded article as it is being formed). In some embodiments, the polyurethane composite disclosed herein has a density at the surface that is no greater than twice the density of the core (as opposed to polyurethane composites with skins wherein the polyurethane composite has a density at the surface that is greater than twice the density of the core). In some embodiments, the polyurethane composite disclosed herein has a density at the surface that is no greater than 1.75 times 1.5 times, or 1.25 times the density of the core.

The inclusion of the evaporative coolant can allow the molded articles to tolerate higher levels of highly reactive polyols, highly reactive isocyanates, and/or catalysts than polyurethane systems where the evaporative coolant is not used. These highly reactive polyurethane systems generate heat more quickly, thereby creating a significant exothermic release during polyurethane formation, which can result in scorching the resultant polyurethane, a reduction in the composite's physical properties, processing difficulties and even safety concerns. The addition of an evaporative coolant allows the use of highly reactive polyurethane systems and/or can result in the production of a molded article with better physical properties without having to increase the reactivity of the polyurethane system. Thus, the disclosed process allows a suitable article to be demolded without slowing down the process or adding additional catalysts.

The polyurethane as it reacts and the resulting molded polyurethane article have a discontinuous cell structure that allows the evaporative coolant to migrate to the surface of the mixture. This is due, in part, to the use of higher filled polyurethane systems having a inorganic filler content of 40% to 90% by weight, based on the weight of the composite mixture. In these highly filled polyurethane composites, a complete cellular structure is not possible due to cell collapse resulting from the solid particles. The composite can have an inconsistent structure that includes domains of irregular cells, voids, and/or clusters of filler bonded together with polyurethane. In some embodiments, these highly filled composites have a cell count of less than 100 per linear inch (pli), for example, less than 90 pli, less than 80 pli, less than 70 pli, less than 60 pli, less than 50 pli, less than 40 pli, less than 30 pli, less than 20 pli, less than 10 pli, less than 5 pli, or even 0 pli (i.e., a non-cellular structure with no defined cells).

In some embodiment, the composite mixture described herein can be foamed. The polyol and the isocyanate can be allowed to produce a foamed composite material after mixing the components according to the methods described herein. The composite materials can be formed while they are actively foaming or after they have foamed. For example, the material can be placed under the pressure of a mold cavity prior to or during the foaming of the composite material.

The polyurethane composites can be formed into shaped articles and used in various applications including building materials. Examples of such building materials include siding material, roof coatings, roof tiles, roofing material, carpet backing, flexible or rigid foams such as automotive foams (e.g., for dashboard, seats or roofing), component coating, and other shaped articles. Examples of shaped articles made using composite materials described herein include roofing material such as roof tile shingles; siding material; trim boards; carpet backing; synthetic lumber; building panels; scaffolding; cast molded products; decking materials; fencing materials; marine lumber; doors; door parts; moldings; sills; stone; masonry; brick products; posts; signs;

guard rails; retaining walls; park benches; tables; slats; and railroad ties. The polyurethane composites described herein further can be used as reinforcement of composite structural members including building materials such as doors; windows; furniture; and cabinets and for well and concrete repair. The polyurethane composites described herein also can be used to fill gaps, particularly to increase the strength of solid surface articles and/or structural components.

The polyurethane composites can be flexible, semi-rigid or rigid foams. In some embodiments, the flexible foam is reversibly deformable (i.e. resilient) and can include open cells. A 8"×1"33 1" piece of a flexible foam can generally wrap around a 1" diameter mandrel at room temperature without rupture or fracture. Flexible foams also generally have a density of less than 5 lb/ft$^3$ (e.g. 1 to 5 lb/ft$^3$). In some embodiments, the rigid foam is irreversibly deformable and can be highly crosslinked and/or can include closed cells. Rigid foams generally have a density of 5 lb/ft$^3$ or greater. In some embodiments, the overall density of the molded article can be 5 lb/ft$^3$ or greater. For example, the overall density of the molded article can be 5 lb/ft$^3$ to 80 lb/ft$^3$, 10 lb/ft$^3$ to 70 lb/ft$^3$, 15 lb/ft$^3$ to 65 lb/ft$^3$, 20 lb/ft$^3$ to 60 lb/ft$^3$, 25 lb/ft$^3$ to 55 lb/ft$^3$, or 30 lb/ft$^3$ to 50 lb/ft$^3$.

Experimental

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the scope of the disclosure. Unless indicated otherwise, parts are parts by weight, temperature is in ° C. or is at ambient temperature, and pressure is at or near atmospheric.

Effect of Evaporative Solvent on Polyurethane Composite

Eight polyurethane ccomposites were prepared using eight different evaporative coolant samples (Samples 1-8) as described below. The evaporative coolant was mixed with a polyol blend containing 30% by weight CARPOL® MX-425 (Mannich base polyether polyol), 19.7% by weight CARPOL® GP-725 (alkylene oxide-capped glycerine), 19.3% by weight CARPOL® GSP-355 (sucrose-based polyether polyol), 19% by weight TEROL® 352 (aromatic polyester polyol), and 10% by weight EDAP-800 (ethylene diamine, propylene oxide and ethylene oxide based polyether polyol) to produce a polyol mixture. The polyol mixture was then mixed with 1% by weight of an amine catalyst (diethanolamine), and 2% by weight of a silicone surfactant (Tegostab B-8870) in an extruder. Fly ash (in the amounts disclosed in Table 1) was added and wetted with the liquid solution. Methylene diphenyl diisocyanate (MDI; 104 index; 51.5 g) was then added to the extruder, and simultaneously stirring began. The mixture was extruded into a belt molding system and allowed to cure. The physical properties of the composites, including surface blemishes, were observed. Table 1 summarizes the results obtained.

TABLE 1

Results from addition of evaporative coolant to polyurethane composites.

| Sample | Evaporative Coolant (phpp) | Fly Ash (% in product) | Tin Catalyst (phpp) | Water (phpp) | Amine Catalyst (phpp) | Density (lb/ft$^3$) | Surface Blemishes |
|---|---|---|---|---|---|---|---|
| 1 | None | 72 | 0.17 | 1.00 | 1.1 | 48.6 | Yes |
| 2 | 0.5 Acetone | 73.5 | 0.7 | 1.10 | 0.6 | 48.5 | Minor |
| 3 | 0.5 Pentane | 73 | 0.45 | 1.05 | 1.25 | 46.9 | Minor |
| 4 | 1.0 Pentane | 70 | 0.17 | 0.45 | 0.6 | 46.0 | No |
| 5 | 1.0 Pentane | 73 | 0.15 | 0.65 | 0.65 | 48.8 | No |
| 6 | 1.13 134A | 73 | 0 | 0.50 | 1.8 | 49.0 | No |
| 7 | 1.13 134A | 73 | 0 | 0.65 | 1.9 | 49.0 | No |
| 8 | 1.5 134A | 73 | 0 | 0.60 | 0.65 | 48.7 | No |
| 9 | 3.0 134A | 73 | 0.25 | 0.50 | 0.25 | 48.1 | No |
| 10 | 8.0 245FA | 74 | 0.22 | 0.60 | 0.30 | 47.5 | No |

134A = 1,1,1,2-tetrafluoroethane
245FA = 1,1,1,3,3-pentafluoropropane
phpp = parts per hundred parts polyol The compositions and methods of the appended claims are not limited in scope by the specific compositions and methods described herein, which are intended as illustrations of a few aspects of the claims and any compositions and methods that are functionally equivalent are intended to fall within the scope of the claims. Various modifications of the compositions and methods in addition to those shown and described herein are intended to fall within the scope of the appended claims. Further, while only certain representative materials and method steps disclosed herein are specifically described, other combinations of the materials and method steps also are intended to fall within the scope of the appended claims, even if not specifically recited. Thus, a combination of steps, elements, components, or constituents may be explicitly mentioned herein; however, other combinations of steps, elements, components, and constituents are included, even though not explicitly stated. The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments and are also disclosed. As used in this disclosure and in the appended claims, the singular forms "a", "an", "the", include plural referents unless the context clearly dictates otherwise.

What is claimed is:

1. A method of making a polyurethane composite, comprising:
introducing, in a continuous mold cavity formed by an interior mold surface of two opposed belts, a mixture of:
(1) at least one isocyanate selected from the group consisting of diisocyanates, polyisocyanates, and mixtures thereof,
(2) at least one polyol,
(3) an inorganic filler,
(4) water, and
(5) an evaporative coolant having a boiling point of −30° C. to 40° C., wherein the evaporative coolant is present in an amount of 0.1% to 2% by weight based on a total weight of polyols in the mixture;
wherein the inorganic filler is dispersed within the mixture to form a cell structure that enables the evaporative coolant to migrate to an interface between the mixture and the interior mold surface;
wherein the at least one isocyanate and the at least one polyol react and generate heat in the mold cavity to form the polyurethane composite, and the temperature of the mixture causes evaporation of the evaporative coolant at the interface thereby removing heat at the interface to reduce surface defects of the polyurethane composite; and
wherein the inorganic filler is present in an amount of 52% to 90% by weight based on a total weight of the polyurethane composite.

2. The method of claim 1, wherein the polyurethane composite is defined by at least one surface in physical contact with the interior mold surface and a core, wherein the density at the surface of the polyurethane composite is less than twice the density at the core of the polyurethane composite.

3. The method of claim 1, wherein the evaporative coolant comprises a hydrofluorocarbon, a hydrochlorofluorocarbon, or a combination thereof.

4. The method of claim 1, wherein the evaporative coolant is selected from the group consisting of dichlorotrifluoroethane, chlorodifluoromethane, pentafluoropropane, chlorotetrafluoroethane, tetrafluoroethane, fluoroform, pentatetrafluoropropane, nonafluorobutane, octafluorobutane, undecafluoropentane, methyl fluoride, difluoromethane, ethyl fluoride, difluoroethane, trifluoroethane, difluoroethene, trifluoroethene, fluoroethene, pentafluoropropene, tetrafluoroethane, tetrafluoropropene, trifluoropropene, difluoropropene, heptafluorobutene, hexafluorobutene, nonafluoropentene, chlorofluoromethane, chloromethane, dichlorofluoromethane, chlorotrifluoroethane, chlorodifluoroethane, chlorofluoroethane, chloroethane, dichlorodifluoroethane, dichlorofluoroethane, dichloroethane, trichlorofluoroethane, trichlorodifluoroethane, trichloroethane, tetrachlorofluoroethane, chloroethene, dichloroethene, dichlorofluoroethene, dichlorodifluoroethene, and mixtures thereof.

5. The method of claim 1, wherein the evaporative coolant is selected from the group consisting of pentafluoropropane, trifluoropropene, and mixtures thereof.

6. The method of claim 1, wherein the evaporative coolant is present in the mixture in an amount of from 1% to 2% by weight based on the total weight of the polyols in the mixture.

7. The method of claim 1, wherein the evaporative coolant is combined with the at least one polyol prior to mixing the at least one isocyanate, the at least one polyol, the inorganic filler, and the water.

8. The method of claim 1, wherein the evaporative coolant is combined with the at least one isocyanate prior to mixing the at least one isocyanate, the at least one polyol, the inorganic filler, and the water.

9. The method of claim 1, wherein the water is present in the mixture in an amount of from greater than 0% to 5% by weight, based on the weight of the mixture.

10. The method of claim 1, wherein the inorganic filler comprises fly ash.

11. The method of claim 1, wherein the polyurethane composite has a density of 10 lb/ft$^3$ to 70 lb/ft$^3$.

12. The method of claim 11, wherein the polyurethane composite has a density of 20 lb/ft$^3$ to 60 lb/ft$^3$.

13. A method of making a polyurethane composite, comprising:
  introducing, in a continuous mold cavity formed by an interior mold surface of two opposed belts, a mixture of:
  (1) at least one isocyanate selected from the group consisting of diisocyanates, polyisocyanates, and mixtures thereof,
  (2) two or more polyols, wherein greater than 60% by weight of the total weight of polyols in the mixture have a hydroxyl number greater than 550 mg KOH/g,
  (3) an inorganic filler,
  (4) water, and
  (5) an evaporative coolant having a boiling point of −30° C. to 40° C., wherein the evaporative coolant is present in an amount of 0.1% to 2% by weight based on a total weight of polyols in the mixture;
  the mixture being prepared in an extruder prior to introduction into the mold cavity, such that the inorganic filler is dispersed in the mixture to form a cell structure that enables the evaporative coolant to migrate to an interface between the mixture and the interior mold surface; and
  generating the polyurethane composite by reacting the at least one isocyanate and the at least one polyol, wherein the reaction generates heat in the mold cavity;
  wherein the temperature of the mixture causes evaporation of the evaporative coolant at the interface, thereby removing heat at the interface and inhibiting formation of defects at a surface of the polyurethane composite, and
  wherein the inorganic filler is present in an amount of 52% to 90% by weight based on a total weight of the polyurethane composite.

14. The method of claim 13, wherein the evaporative coolant comprises a hydrofluorocarbon, a hydrochlorofluorocarbon, or a combination thereof.

15. The method of claim 13, wherein the evaporative coolant is selected from the group consisting of dichlorotrifluoroethane, chlorodifluoromethane, pentafluoropropane, chlorotetrafluoroethane, tetrafluoroethane, fluoroform, pentatetrafluoropropane, nonafluorobutane, octafluorobutane, undecafluoropentane, methyl fluoride, difluoromethane, ethyl fluoride, difluoroethane, trifluoroethane, difluoroethene, trifluoroethene, fluoroethene, pentafluoropropene, tetrafluoroethane, tetrafluoropropene, trifluoropropene, difluoropropene, heptafluorobutene, hexafluorobutene, nonafluoropentene, chlorofluoromethane, chloromethane, dichlorofluoromethane, chlorotrifluoroethane, chlorodifluoroethane, chlorofluoroethane, chloroethane, dichlorodifluoroethane, dichlorofluoroethane, dichloroethane, trichlorofluoroethane, trichlorodifluoroethane, trichloroethane, tetrachlorofluoroethane, chloroethene, dichloroethene, dichlorofluoroethene, dichlorodifluoroethene, and mixtures thereof.

16. The method of claim 13, wherein the evaporative coolant is selected from the group consisting of pentafluoropropane, trifluoropropene, and mixtures thereof.

17. The method of claim 13, wherein the water is present in the mixture in an amount of from greater than 0% to 5% by weight, based on the weight of the mixture.

18. The method of claim 13, wherein the mixture comprises from 70% to 90% by weight of the inorganic filler, based on the weight of the polyurethane composite.

19. The method of claim 18, wherein the inorganic filler comprises fly ash.

20. The method of claim 13, wherein the polyurethane composite has a density of 10 lb/ft$^3$ to 70 lb/ft$^3$.

21. The method of claim 13, wherein the polyurethane composite has a density of 20 lb/ft$^3$ to 60 lb/ft$^3$.

22. The method of claim 13, wherein the at least one polyol includes 50% or more of one or more first polyols, the one or more first polyols each comprising 75% or more primary hydroxyl groups based on the total number of hydroxyl groups in the polyol.

23. A method of making a polyurethane composite, comprising:
  providing, in a continuous mold cavity formed by an interior mold surface of two opposed belts, a mixture of:
  (1) at least one isocyanate selected from the group consisting of diisocyanates, polyisocyanates, and mixtures thereof,
  (2) two or more polyols comprising at least one aromatic polyester polyol,
  (3) 52% to 90% by weight of an inorganic filler, based on the weight of the mixture,
  (4) water, and
  (5) an evaporative coolant having a boiling point of −30° C. to 40° C., wherein the evaporative coolant is present in an amount of 0.1% to 2% by weight based on a total weight of polyols in the mixture;
  the mixture being prepared in an extruder prior to introduction into the mold cavity, such that the inorganic filler is dispersed in the mixture to form a cell structure that enables the evaporative coolant to migrate to an interface between the mixture and the interior mold surface; and
  generating the polyurethane composite by reacting the at least one isocyanate and the at least one polyol, wherein the reaction generates heat in the mold cavity, the evaporative coolant migrates to the interface, and the temperature of the mixture causes evaporation of the evaporative coolant at the interface to thereby remove heat at the interface and reduce defects at a surface of the polyurethane composite; and wherein the polyurethane composite has a density of 10 lb/ft$^3$ to 70 lb/ft$^3$.

24. The method of claim 23, wherein the polyurethane composite has a density of 20 lb/ft$^3$ to 60 lb/ft$^3$.

25. The method of claim 23, wherein the evaporative coolant is selected from the group consisting of dichlorotrifluoroethane, chlorodifluoromethane, pentafluoropropane, chlorotetrafluoroethane, tetrafluoroethane, fluoroform, pentatetrafluoropropane, nonafluorobutane, octafluorobutane, undecafluoropentane, methyl fluoride, difluoromethane, ethyl fluoride, difluoroethane, trifluoroethane, difluoroethene, trifluoroethene, fluoroethene, pentafluoropropene, tetrafluoroethane, tetrafluoropropene, trifluoropropene, difluoropropene, heptafluorobutene, hexafluorobutene, nonafluoropentene, chlorofluoromethane, chloromethane, dichlorofluoromethane, chlorotrifluoroethane, chlorodifluoroethane, chlorofluoroethane, chloroethane, dichlorodifluoroethane, dichlorofluoroethanc, dichlorocthanc, trichlorofluoroethanc, trichlorodifluoroethanc, trichloroethane, tetrachlorofluoroethane, chloroethene, dichloroethene, dichlorofluoroethene, dichlorodifluoroethene, and mixtures thereof.

26. The method of claim 23, wherein the evaporative coolant is selected from the group consisting of pentafluoropropane, trifluoropropene, and mixtures thereof.

27. The method of claim 23, wherein the inorganic filler comprises fly ash present in an amount of 70% to 90% by weight, based on the total weight of the mixture.

28. The method of claim 23, and wherein the water is present in the mixture in an amount of less than 5% by weight, based on the total weight of the mixture.

* * * * *